United States Patent
Wakashiro et al.

(10) Patent No.: US 6,700,213 B1
(45) Date of Patent: Mar. 2, 2004

(54) CONTROL SYSTEM FOR A HYBRID VEHICLE IN WHICH OUTPUT FROM THE ENGINE IS ASSISTED BY THE MOTOR BASED ON AIR-FUEL RATIO DETERMINATION

(75) Inventors: Teruo Wakashiro, Wako (JP); Atsushi Izumiura, Wako (JP); Kan Nakaune, Wako (JP); Takashi Iwamoto, Wako (JP); Asao Ukai, Wako (JP); Katsuhiro Kumagai, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/695,944

(22) Filed: Oct. 26, 2000

(30) Foreign Application Priority Data

Oct. 29, 1999 (JP) .......................... 11-310348

(51) Int. Cl.$^7$ .......................... B60K 1/00; F02N 11/06; H02P 9/04
(52) U.S. Cl. .................. 290/40 C; 180/65.1
(58) Field of Search ................. 290/40 C; 180/65.1

(56) References Cited

U.S. PATENT DOCUMENTS

| | | | | |
|---|---|---|---|---|
| 5,942,879 A | * | 8/1999 | Ibaraki | 322/16 |
| 5,984,033 A | * | 11/1999 | Tamagawa et al. | 180/65.2 |
| 6,009,965 A | * | 1/2000 | Takanohashi et al. | 180/65.2 |
| 6,020,697 A | * | 2/2000 | Shimasaki et al. | 318/140 |
| 6,079,629 A | * | 6/2000 | Morikawa et al. | 237/12.3 C |
| 6,327,850 B1 | * | 12/2001 | Yasui et al. | 123/692 |
| 6,341,599 B1 | * | 1/2002 | Hada et al. | 123/688 |
| 6,343,246 B1 | * | 1/2002 | Matsubara et al. | 180/65.1 |

* cited by examiner

*Primary Examiner*—Nicholas Ponomarenko
*Assistant Examiner*—Julio C. Gonzalez
(74) *Attorney, Agent, or Firm*—Armstrong, Westerman & Hattori, LLP

(57) ABSTRACT

A control system provided in a hybrid vehicle with a combustion engine for outputting a driving force, an electric motor for generating a force for assisting the output from the engine, depending on driving conditions, a power storage unit for storing electric energy generated by the motor acting as a generator using the output from the engine and electric energy regenerated by the motor when the vehicle decelerates. The control system includes an output assist determination means for determining, based on a determination threshold value as the standard, whether to assist the output from the engine by the motor, depending on the driving conditions of the vehicle. An air-fuel controller is provided for changing the air-fuel ratio of the mixture, which is to be supplied to the engine, to a condition leaner or richer than the stoichiometric air-fuel ratio. A determination threshold value changing means is provided for changing the determination threshold value, depending on whether the air-fuel ratio of the mixture is leaner or richer than the stoichiometric air-fuel ratio. A determination threshold value change prohibiting means is provided for prohibiting the operation of the determination threshold value changer when the air-fuel controller changes the air-fuel ratio of the mixture from a condition leaner than the stoichiometric air-fuel ratio to a condition richer than the stoichiometric air-fuel ratio.

13 Claims, 14 Drawing Sheets

CONTROL SYSTEM FOR A HYBRID VEHICLE IN WHICH OUTPUT FROM THE ENGINE IS ASSISTED BY THE MOTOR BASED ON AIR-FUEL RATIO DETERMINATION

BACKGROUND OF THE INVENTION

1. Field of the Invention

The present invention relates to a control system for a hybrid vehicle with an engine and a motor, and in particular, to a control system for a hybrid vehicle which determines whether the output from the engine is assisted by the motor with reference to an air-fuel ratio of an air-fuel mixture which is supplied to the engine.

This application is based on Japanese Patent Application No. Hei 11-310348, the contents of which are incorporated herein by reference.

2. Description of Related Art

Conventionally, hybrid vehicles which carry electric motors as power sources for driving vehicles in addition to engines are known. One kind of conventional hybrid vehicle is a parallel hybrid vehicle which uses a motor as an assisting driving source for assisting the output from the engine. In the parallel hybrid vehicle, for example, when the vehicle accelerates the output from the engine is assisted by the motor, a battery is charged by deceleration regeneration when the vehicle decelerates, and various controls are performed while maintaining electric energy of the battery (which is hereinafter called the "state of charge (remaining battery charge)") in response to the driver's demands (as disclosed in, for example, Japanese Unexamined Patent Application, First Publication, No. Hei 7-123509).

In an example of the above-described conventional hybrid vehicle, when an air-fuel ratio of an air-fuel mixture which is supplied to the engine is frequently shifted between the air-fuel ratio for the lean state, which is lower than the theoretical air-fuel ratio (a stoichiometric state), and the air-fuel ratio for the rich state, which is higher than the theoretical air-fuel ratio, in response to the running condition of the engine, an assist determination threshold value (a standard value which determines whether the output from the engine by the motor is assisted) is changed. Accordingly, the engine output assistance by the motor may be started or stopped.

When the air-fuel ratio of the air-fuel mixture which is supplied to the engine, is set at the lean state in which the air-fuel ratio is lower than the theoretical air-fuel ratio, that is, a lean-burn control is performed, the amount of nitrogen oxide (NOx) exhaust tends to increase. As an example of a conventional art which prevents the amount of NOx exhaust from increasing, an exhaust gas control device which includes an NOx absorbent which absorbs or adsorbs NOx and which is provided in the exhaust system of the engine to purify the exhaust gas is known.

When the air-fuel ratio of the exhaust gas is lower than the theoretical air-fuel ratio, that is, the air-fuel ratio of the exhaust gas is set at the lean state, and the oxygen concentration in the exhaust gas is relatively high, the NOx absorbent absorbs or adsorbs NOx. When the air-fuel ratio of the exhaust gas is in the vicinity of or higher than the theoretical air-fuel ratio, that is, when the air-fuel ratio is set at the rich state, and the oxygen concentration in the exhaust gas is relatively low and the concentration of hydrocarbons (HC), carbon monoxide (CO), and the like included in the exhaust gas is high, then NOx absorbed or adsorbed in the NOx absorbent is deoxidized and converted to nitrogen gas and emitted.

When the engine output assistance by the motor is repeatedly started and stopped, problems arise such that drivability decreases and drivers feel discornfort.

NOx is accumulated in the NOx absorbent, so that the purification efficiency of NOx is reduced, therefore, it is necessary to emit NOx accumulated in the NOx absorbent at a suitable time. The air-fuel ratio of the exhaust gas flowing into the NOx absorbent is temporarily set at the rich state, which is higher than the theoretical air-fuel ratio and NOx is emitted from the NOx absorbent Simultaneously, HC, CO, and the like, which are contained in the exhaust gas of the rich state, are used to control the reduction and purification of NOx emitted (hereinafter called a "rich spike"), so that the NOx absorbent is regenerated (as is disclosed, for example, in Japanese Unexamined Patent Application, First Publication, No. Hei 10-276267).

In the control system of hybrid vehicles according to the example of the above conventional art, when the standard which determines whether to start the engine output assistance by the motor is changed depending on whether the air-fuel ratio of the air-fuel mixture which is supplied to the engine is set at the lean state, that is, the air-fuel ratio is lower than the theoretical air-fuel ratio, or at the rich state, that is, the air-fuel ratio is higher than the theoretical air-fuel ratio, the running condition of the vehicle may change whenever a rich spike control is executed.

For example, since the output from the engine is relatively low when the lean-burn control is performed, the driver may depress the accelerator pedal to maintain the drivability. If the rich spike control is executed in this condition, the engine output assistance by the motor may be suddenly started. Therefore, an unexpected acceleration or the like may be experienced by the driver.

Additionally, if such a rich spike is, for example, repeatedly executed at predetermined intervals, the vehicle's running condition will be jerky and the vehicle will not run smoothly, and the drivability deteriorates.

SUMMARY OF THE INVENTION

It is therefore an object of the present invention to provide a control system for a hybrid vehicle which can prevent the jerky feeling in the running condition of the vehicle and can improve the drivability, even if the air-fuel ratio of the exhaust gas compared with the theoretical air-fuel ratio is temporarily changed from the lean state to the rich state, in order to regenerate the exhaust gas control device used for deoxidizing and purifying nitrogen oxide in the exhaust gas.

To achieve the above object, the control system is provided in a hybrid vehicle of the present invention with a combustion engine (E) for outputting a driving force, an electric motor (M) for generating a force for assisting the output from the engine, depending on the driving conditions, a power storage unit (battery 22) for storing electric energy generated by the motor acting as a generator using the output from the engine and electric energy regenerated by the motor when the vehicle decelerates. The control apparatus comprises: an output assist detenination means (steps S122 and S135) for determining, based on a determination threshold value (the throttle assist trigger threshold value MTHAST, the air intake passage pressure assist trigger threshold value MAST, or the air intake passage pressure assist trigger threshold value MASTTH) as the standard, whether to assist the output from the engine by the motor, depending on the driving condition of the vehicle; an air-fuel controller (FIECU 12) for changing the air-fuel ratio of the mixture, which is to be supplied to the engine, to a condition leaner or richer than the stoichiometric air-fuel ratio; a determination threshold value changing means (steps S251 and S301) for changing the determination threshold value, depending on whether the air-fuel ratio of the mixture is leaner or richer than the stoichiometric air-fuel ratio; and a determination threshold value change prohibiting means (steps S254 and S304) for prohibiting the operation of the determination threshold value changer when the air-fuel controller changes the air-fuel ratio of the mixture from a condition leaner than the stoichiometric air-fuel ratio to a condition richer than the stoichiometric air-fuel ratio.

According to the above control system for a hybrid vehicle, even in the case where the air-fuel ratio of the air-fuel mixture supplied to the engine is temporarily set richer than the stoichiometric air-fuel ratio by the air-fuel ratio controller, for example, in order to recover the absorption capacity of NOx absorbent when the absorbent is degraded, because the determination threshold value change prohibiting means forbids the operation of the determination threshold value change device, the determination threshold to be used for determining whether the electric motor assists the output of the engine remains unchanged. Therefore, the determination threshold for lean burn is continuously used in such a case, and it is possible to prevent a sudden change of driving state due to a change of the determination threshold, and the smoothness in driving vehicle can thereby be improved.

In a second aspect of the present invention, the control system for a hybrid vehicle further comprises a terminating means for terminating the prohibition of the change of the determination threshold value while the determination threshold value change prohibiting device is prohibiting the change of the determination threshold value, when the air-fuel ratio controller detects that the air-fuel ratio of the mixture is leaner than the stoichiometric air-fuel ratio, or when the prohibition of the change of the determination threshold value is maintained for a specified time.

According to the second aspect of the control system for a hybrid vehicle, after the rich-spiking for temporarily setting the air-fuel ratio of the air-fuel mixture richer than the stoichiometric air-fuel ratio is performed, when the air-fuel ratio is reset to a value leaner than the stoichiometric air-fuel ratio, or when a predetermined period of time has passed from the beginning of the prohibition of the threshold value change, the terminating device determines that the air-fuel ratio control by the rich-spiking is complete, and the terminating device terminates the prohibition of the threshold value change. Therefore, it is possible to automatically terminate the prohibition of the threshold value change.

In a third aspect of the present invention, the control system is provided in a hybrid vehicle with a combustion engine (E) for outputting a driving force, an electric motor (M) for generating a force for assisting the output from the engine, depending on the driving conditions, a power storage unit (battery 22) for storing electric energy generated by the motor acting as a generator using the output from the engine and electric energy regenerated by the motor when the vehicle decelerates. The control apparatus comprises: an output assist determination means (steps S122 and S135) for determining, based on a determination threshold value (the throttle assist trigger threshold value MTHAST, the air intake passage pressure assist trigger threshold value MAST, or the air intake passage pressure assist trigger threshold value MASTTH) as the standard, whether to assist the output from the engine by the motor, depending on the driving condition of the vehicle; an air-fuel controller (FIECU 12) for changing the air-fuel ratio of the mixture, which is to be supplied to the engine, to a condition leaner or richer than the stoichiometric air-fuel ratio; a determination threshold value changing means (steps S251 and S301) for changing the determination threshold value, depending on whether the air-fuel ratio of the mixture is leaner or richer than the stoichiometric air-fuel ratio; an exhaust cleaner (40) having an oxygen concentration measurement device (S9), provided in an exhaust system of the engine, for measuring the oxygen concentration in the exhaust gas, and a nitrogen oxide reduction device (NOx absorption capacity 42) for absorbing nitrogen oxide in the exhaust gas when the oxygen concentration in the exhaust gas is high and for reducing the absorbed nitrogen oxide when the oxygen concentration in the exhaust gas is low; a reduction means (FIECU 12 also performs this function) for setting the air-fuel ratio of the mixture to a condition richer than the stoichiometric air-fuel ratio so as to reduce the oxygen concentration in the exhaust gas, when the air-fuel ratio of the mixture, which is to be supplied to the engine, is leaner than the stoichiometric air-fuel ratio; and a determination threshold value change prohibiting means (steps S254 and S304) for prohibiting the operation of the determination threshold value changing means when the reduction device changes the air-fuel ratio of the mixture from a condition leaner than the stoichiometric air-fuel ratio to a condition richer than the stoichiometric air-fuel ratio.

According to the third aspect of the control system for a hybrid vehicle, it can be determined whether the air-fuel ratio of the exhaust gas flowing into the nitrogen oxide reduction device is leaner than the stoichiometric air-fuel ratio, and based on the result of this determination, the air-fuel ratio of the mixture gas to be supplied to the engine is controlled. Therefore, it is possible to precisely detect the state of the air-fuel control by a rich-spiking, and the degraded nitrogen oxide reduction device can thereby be securely regenerated. Therefore, the driving state of the vehicle can be precisely determined, the change or prohibition of change of the determination threshold can be controlled based on a precise determination, thus, the smoothness in driving the vehicle can be improved.

In a fourth aspect of the present invention, the control system for a hybrid vehicle according to claim 3 further comprises: a vehicle speed measuring device (vehicle speed sensor S1) for detecting the speed of the vehicle. The reduction means sets the air-fuel ratio of the mixture to the condition richer than the stoichiometric air-fuel ratio so as to reduce the oxygen concentration in the exhaust gas at a time interval depending on the vehicle speed detected by the vehicle speed measuring device.

According to the fourth aspect of the present invention, because the degree of the deterioration of the nitrogen oxide reduction means is indirectly determined based on the driving state of the vehicle, and rich-spiking is performed at a time interval depending on the vehicle speed detected by the vehicle speed measuring device, it is possible to set an appropriate frequency of the rich-spiking and to improve the smoothness in driving the vehicle.

In a fifth aspect of the present invention the control system for a hybrid vehicle further comprises a terminating means (steps S256 and S306) for terminating the prohibition of the change of the determination threshold value while the determination threshold value change prohibiting means prohibits the change of the determination threshold value, when the air-fuel ratio controller detects that the air-fuel ratio of the mixture is leaner than the stoichiometric air-fuel ratio, or when the prohibition of the change of the determination threshold value is maintained for a specified time.

According to the fifth aspect of the present invention, after the rich-spiking for setting the air-fuel ratio of the air-fuel mixture richer than the stoichiometric air-fuel ratio is performed so as to relatively decrease the oxygen concentration in the exhaust gas, when the air-fuel ratio is reset to a value leaner than the stoichiometric air-fuel ratio, or when a predetermined period of time has passed from the beginning of the prohibition of the threshold value change, the terminating means determines that the air-fuel ratio control by the rich-spiking has been completed, and the terminating means terminates the prohibition of the threshold value change. Therefore, it is possible to automatically terminate the prohibition of the threshold value change.

DETAILED DESCRIPTION OF THE INVENTION

An embodiment of the control system of the hybrid vehicle will be explained with reference to the figures.

Figure 1:
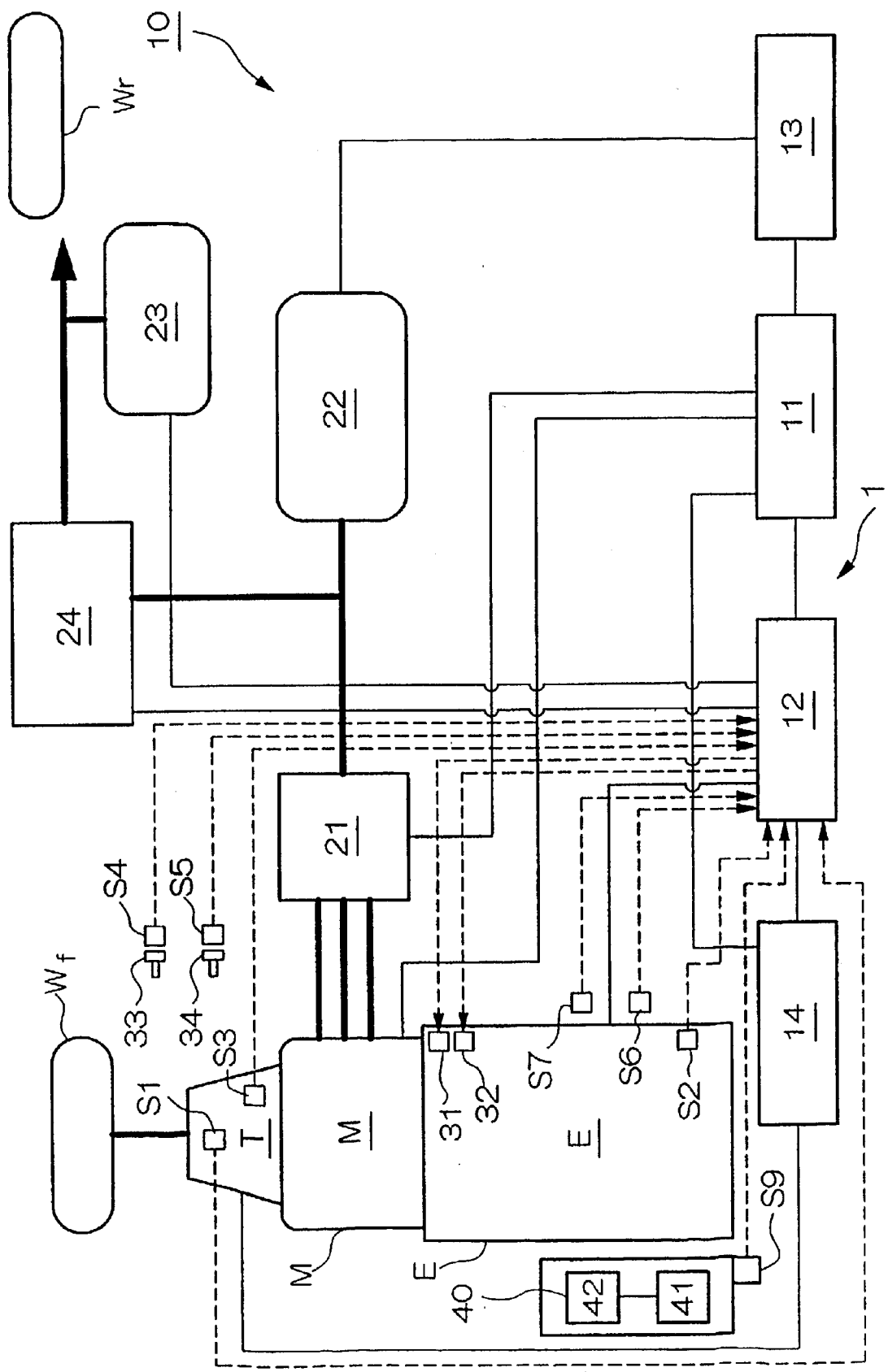
FIG. 1 is a block diagram showing a hybrid vehicle comprising a control system according to the first embodiment of the present invention.

FIG. 1 is a block diagram of a hybrid vehicle 10 including a control system 1 for a hybrid vehicle according to the first embodiment of the present invention. The hybrid vehicle 10 is, for example, a parallel hybrid vehicle. The driving forces from an engine E and a motor M are transmitted via a transmnission T, such as an automatic transmission or a manual transmission, to front wheels Wf which are the drive wheels. When the hybrid vehicle 10 decelerates and the driving force is transmitted from the front wheels Wf to the motor M, the motor M acts as a generator to generate a regenerative braking force, so that the kinetic energy of the vehicle body is stored as electric energy.

The control system 1 for a hybrid vehicle according to the first embodiment of the present invention includes a motor ECU 11, an FIECU 12, a battery ECU 13, and a CVTECU 14.

The driving and regeneration of the motor M are performed by a power drive unit 21 according to control commands from a motor ECU 11. A high voltage battery 22 for sending and receiving electric energy to and from the motor M is connected to the power drive unit 21. The battery 22 includes a number of modules, (for example, 10,) connected in series, and in each module a number of cells, (for example, 20,) are connected in series. The hybrid vehicle 10 includes a 12-volt auxiliary battery 23 for driving various accessories. The auxiliary battery 23 is connected to the battery 22 via a downverter 24. The downverter 24, controlled by an FIECU 12, reduces the voltage from the battery 22 and charges the auxiliary battery 23.

The FIECU 12 controls, in addition to the motor ECU 11 and the downverter 24, a fuel supply amount controller 31 for controlling the amount of fuel supplied to the engine E, a starter motor 32, an ignition timing, etc. In order to accomplish this, the FIECU 12 receives a signal from a speed sensor SI for detecting the vehicle speed V based on the rotation of the driving shaft of the transmission T, a signal from an engine rotational speed sensor S2 for detecting the engine rotational speed NE, a signal from a shift position sensor S3 for detecting the shift position of the transmission T, a signal from a brake switch S4 for detecting operation of a brake pedal 33, a signal from a clutch switch S5 for detecting operation of a clutch pedal 34, a signal from a throttle valve opening sensor S6 for detecting the degree of throttle opening TH, and a signal from an air intake passage pressure sensor S7 for detecting the air intake passage pressure PB.

The battery ECU 13 protects the battery 22 and calculates the state of charge SOC (remaining battery charge) of the battery 22. The CVTECU 14 controls a CVT.

The hybrid vehicle 10 includes an exhaust gas control device 40. The exhaust gas control device 40 includes a catalyst for purifying components such as HC, CO, and NOx in the exhaust gas, for example, a three way catalyst 41, a nitrogen oxide (NOx) absorbent 42, and an oxygen concentration detector S9.

When the NOx absorbent 42 is composed of a catalyst containing platinum (Pt) and the like and the air-fuel ratio of the exhaust gas is set to the lean state, which is lower than the theoretical air-fuel ratio, the NOx absorbent 42 absorbs NOx in the exhaust gas. "Absorption" means a condition in which either, for example, NOx is converted into a nitrate ion such as $NO_3$ and the nitrate ion is absorbed or diffused into the catalyst, or NOx is chemically adsorbed on the surface of the catalyst. When the air-fuel ratio of the exhaust gas is set to the rich state, which is higher than the theoretical air-fuel ratio and the oxygen concentration in the exhaust gas is reduced, NOx absorbed in the NOx absorbent 42 is deoxidized by reacting with unburned HC, CO, and the like which increase in quantity in the exhaust gas, and is converted and emitted as $N_2$.

The oxygen concentration detector S9 is, for example, a proportional air-fuel ratio (LAF) sensor functioning as a proportional oxygen concentration detector, and the detector S9 outputs and supplies an electric signal to FIECU 12 approximately in proportion to the concentration of the oxygen in the exhaust gas.

The control system 1 for a hybrid vehicle according to the present invention is essentially composed of the above. Next, the operation for the control system 1 for a hybrid vehicle will be explained with reference to the figures.

The control modes of the hybrid vehicle 10 are "idle mode", "idle stop mode", "deceleration mode", "acceleration mode", and "cruise mode." In the idle mode, the supply of the fuel is restarted after the fuel cut, and the engine E is maintained in an idling state. In the idle stop mode, for example, the engine E is stopped according to a predetermined condition when the vehicle is stopped. In the deceleration mode, the regenerative braking is performed by the motor M. In the acceleration mode, the output of the engine E is assisted by the motor M. In the cruise mode, the motor M is not driven, and the vehicle is moved by the driving force from the engine E.

Zoning of the State of Charge (SOC)

The zoning of the state of charge SOC (dividing the remaining charge into zones) will be explained. The calculation of the SOC is carried out by the battery ECU 13, based on, i.e., the voltage, the discharged current, or the temperature.

In this example, zone A (an SOC of 40% to 80% or 90%), which is the normal use zone, is defined as the standard. Zone B (an SOC of 20% to 40%), which is a temporary use zone, is below zone A, and zone C (an SOC of 0% to 20%), which is an over-discharge zone, is below zone B. Zone D (an SOC of 80% or 90% to 100%), which is an overcharge zone, is above zone A.

The state of charge SOC is calculated by integrating the discharged current when in zones A and B, and is calculated based on the voltages when in zones C and D, taking into consideration the characteristics of the battery. The boundaries between zones A, B, C, and D have upper and lower threshold values. The threshold values when the SOC is increasing are chosen to differ from those when the SOC is decreasing so as to cause hysteresis.

Depth-of-Discharge Limit Determination

Figure 2:
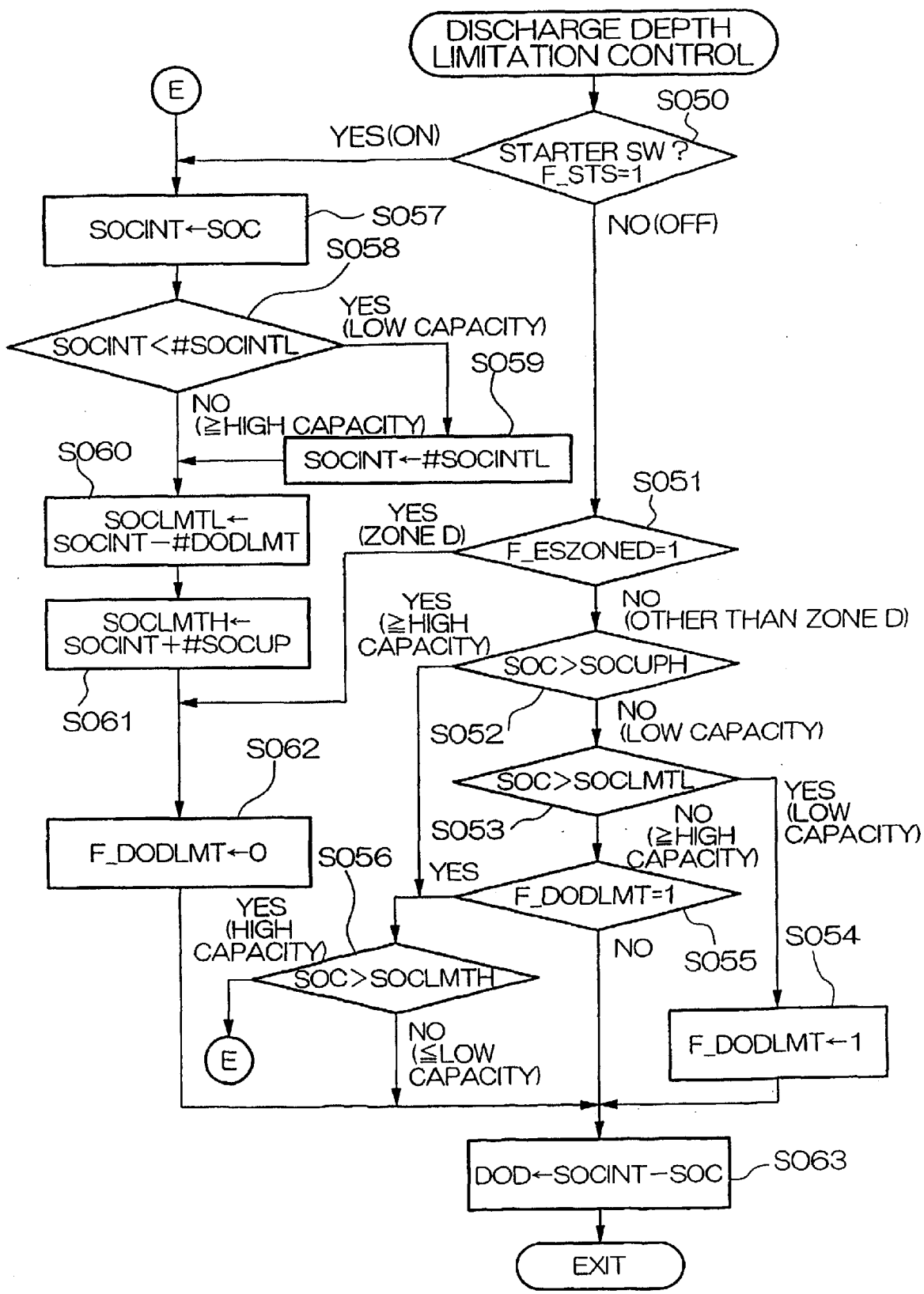
FIG. 2 is a flowchart showing the depth-of-discharge limit determination of the present invention.
Figure 3:
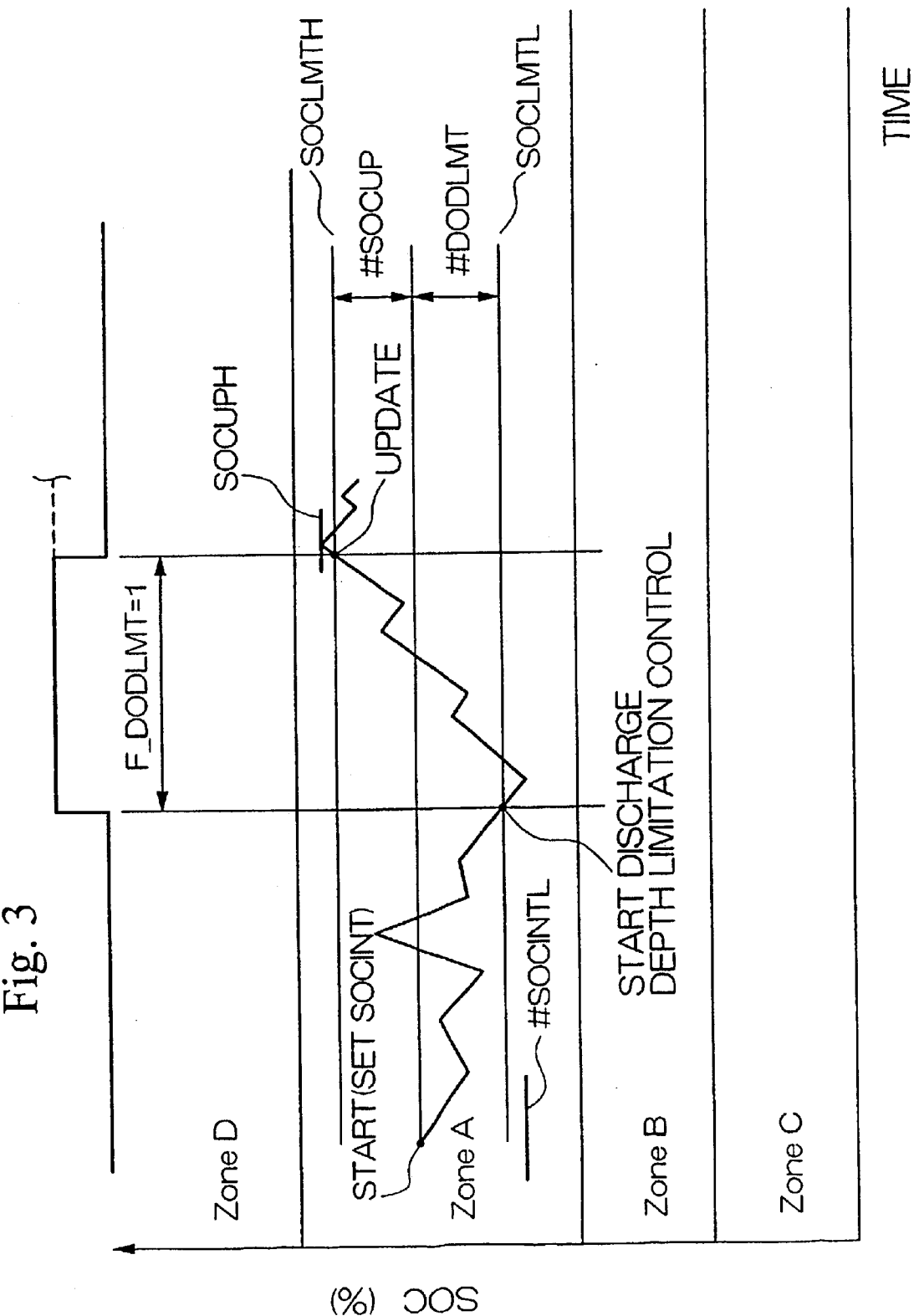
FIG. 3 is a graph showing the state of charge SOC in the depth-of-discharge limit control mode of the present invention.

The process for determining the depth-of-discharge limit control mode will be explained with reference to FIGS. 2 and 3. FIG. 2 is a flowchart showing the process for determining the depth-of-discharge limit. FIG. 3 is a graph showing the state of charge SOC in the depth-of-discharge limit control mode.

In step S050, it is determined whether the start switch determination flag F_STS has the value 1 or 0, i.e., whether it is a first run (whether the engine has just started). When the start switch determination flag F_STS is 1, that is, when it is the first run, the initial state of charge SOCINT is read in step S057 when the vehicle starts running. Next, in step S058, it is determined whether the initial state of charge SOCINT<#SOCINTL, the initial lower limit value of the depth-of discharge limit. The initial lower limit value of the depth-of-discharge limit #SOCINTL is, for example, 50%.

When in step S058 the determination is "YES", that is, when it is determined that the initial state of charge SOCINT<#SOCINTL (when the SOC is in the low state), the flow proceeds to step S059. The initial state of charge SOCINT is set to the initial lower limit value of the depth-of-discharge limit #SOCINTL in step S059, and then the flow proceeds to step S060. For example, when the initial lower limit value of the depth-of-discharge limit #SOCINTL is 50% and the initial state of charge SOCINT is less than 50%, SOCINT is set to the value of #SOCINTL, of 50%.

When in step S058 the determination is "NO", that is, when it is determined that the initial state of charge SOCINT≧#SOCTNTL, the initial lower limit value of the depth-of-discharge limit (when the SOC is in the high state), the flow proceeds to step S060.

As shown in FIG. 3, the lower threshold value SOCLMTL is set in step S060 based on the initial state of charge SOCINT and the upper threshold value SOCLMTH is set in step S061. The depth-of-discharge limit value #DODLMT for determining the lower threshold value SOCLMTL is, e.g., 10% of the SOC, taking into consideration the individual characteristics of the battery 3. The SOC increasing value #SOCUP to release the depth-of-discharge limit value #DODLMT for determining the upper threshold value SOCLMTH is, e.g., 5% of the SOC.

For example, when the initial state of charge SOCINT is 55%, the lower threshold value SOCLMTL is 45% and the upper threshold value SOCLMTH is 60%. When the SOCINT is 40% in step S058, the SOCINT is set to the initial lower limit value of the depth-of-discharge limit #SOCINTL, for example, 50%. Therefore, the lower threshold value SOCLMTL is 40% and the upper threshold value SOCLMTH is 55%.

As described above, when the initial state of charge SOCINT is equal to or below the initial lower limit value of the depth-of-discharge limit #SOCINTL, the SOCINT is set to the #SOCINTL. The depth-of-discharge from the SOCINT to the lower threshold value SOCLMTL is decreased by increasing the initial value. When SOC is in the low state during starting, that is, SOC is equal to or below the initial lower limit value of the depth-of-discharge limit #SOCINTL, the time from the start of the depth-of-discharge limit determination to the start of the depth-of-discharge limit control is shortened, or the depth-of-discharge limit control starts at the same time that the depth-of-discharge limit determination starts, if the SOCINT is set to a predetermined value and the remaining battery charge SOC is promptly increased.

Subsequently, in step S062, the last DOD limit determination flag F_DODLMT is set to 0, and the last depth-of-discharge limit control mode is not selected. The flow proceeds to step S063. In step S063, the depth-of-discharge DOD which indicates a discharge amount of SOC in comparison with the initial state of charge SOCINT is determined, and the depth-of-discharge limit control is stopped. Therefore, the depth-of-discharge DOD is determined regardless of the flag value of the DOD limit determination flag F_DODLMT.

When the vehicle starts running, the start switch determination flag F_STS is set to 0 in step S050, and in step S051 it is determined whether the energy storage zone D determination flag is 1. When in step S051 the determination is "NO", that is, when the SOC is outside zone D, the flow proceeds to step S052. When in step S051 the determination is "YES", that is, when the SOC is within zone D, the flow proceeds to step S062.

In step S052, it is determined whether the present state of discharge SOC is above the depth-of-discharge limit execution upper limit value SOCUPH. When the determination is "YES", that is, when it is determined that SOC>SOCUPH (when SOC is high), the flow proceeds to step S056. When in step S052 the determination is "NO", that is, when it is determined that SOC≦SOCUPH (when SOC is low), the flow proceeds to step S053. The depth-of-discharge limit execution upper limit value SOCUPH is set, for example, to 70%.

In step S053, it is determined whether the state of discharge SOC is below the above lower threshold value SOCLMTL. When the determination is "YES", that is, when it is determined that SOC<SOCLMTL (when the SOC is low), the DOD limit determination flag F_DODLMT is set to 1 in step S054 so as to start the depth-of-discharge limit control mode. The flow then proceeds to step S063. Through the above series of steps, control is performed depending on the state of F_DODLMT in assist trigger determination, which will be described later.

In the depth-of-discharge limit control mode, as shown in FIG. 3, electric power is generated so as to increase the state of charge SOC. When in step S053 it is determined that SOC≧SOCLMTL the lower threshold value, that is, when it is determined that the SOC is above the SOCLMTL (when the SOC is high), the state of the DOD limit determination flag F_DODLMT is determined in step S055.

When in step S055 the determination is "YES", that is, when it is determined that the depth-of-discharge limit control mode is performed, it is determined whether the state of charge SOC>SOCLMTH the upper threshold value, that is, whether the SOC is equal to or above the SOCLMTH in step S056. When in step S056 it is determined that SOC>SOCLMTH, that is, when it is determined that SOC is above the SOCLMTH (when SOC is high), the flow proceeds to step S057. The initial state of charge SOCINT is reset, accordingly, the upper threshold value SOCLMTH and the lower threshold value SOCLMTL are reset. The increase of the SOC based on the above reset operation is maintained until the SOC is within zone D. Therefore, the remaining battery charge SOC is promptly increased and an overcharge is prevented.

When in step S055 the DOD limit determination flag F_DODLMT is 0, that is, when the depth-of-discharge limit control mode is not selected, or when in step S056 the state of charge SOC≦SOCLMTH the upper threshold value, that is, when it is determined that the SOC is equal to or below the SOCLMTH (when SOC is low), the flow proceeds to step S063.

The details of the depth-of-discharge limit control mode will be explained.

In the depth-of-discharge limit control mode, when the SOC decreases and is set to the lower threshold value SOCLMTL, the SOC is controlled so that the SOC begins to increase. When the assist trigger threshold value, which determines whether an acceleration is executed, is increased, the frequency of acceleration is decreased, so as to increase the frequency of charging the battery in the cruise mode and the battery becomes charged.

Assist Trigger Determination

Figure 4:
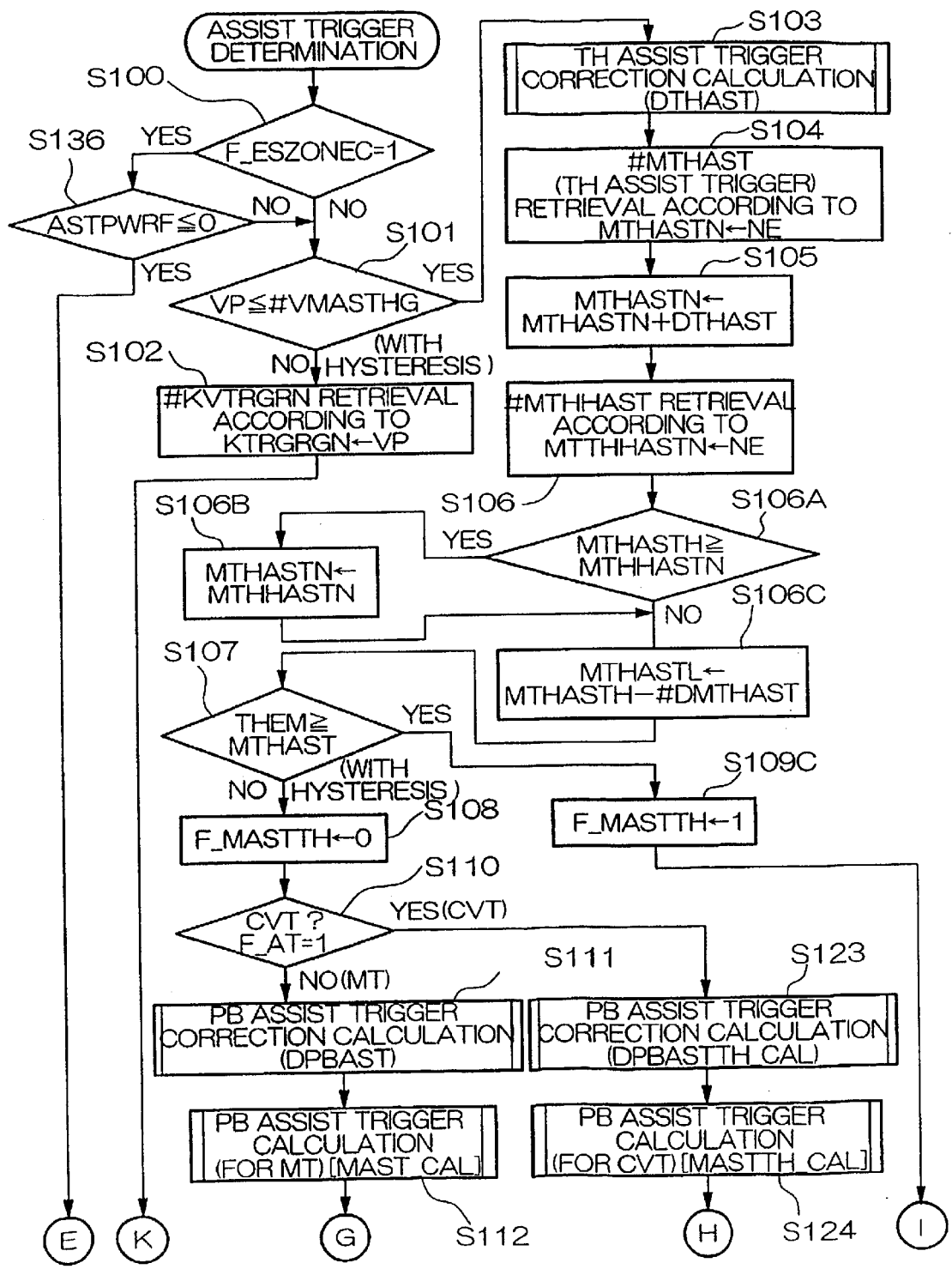
FIG. 4 is a flowchart showing the assist trigger determination of the first embodiment of the present invention.
Figure 5:
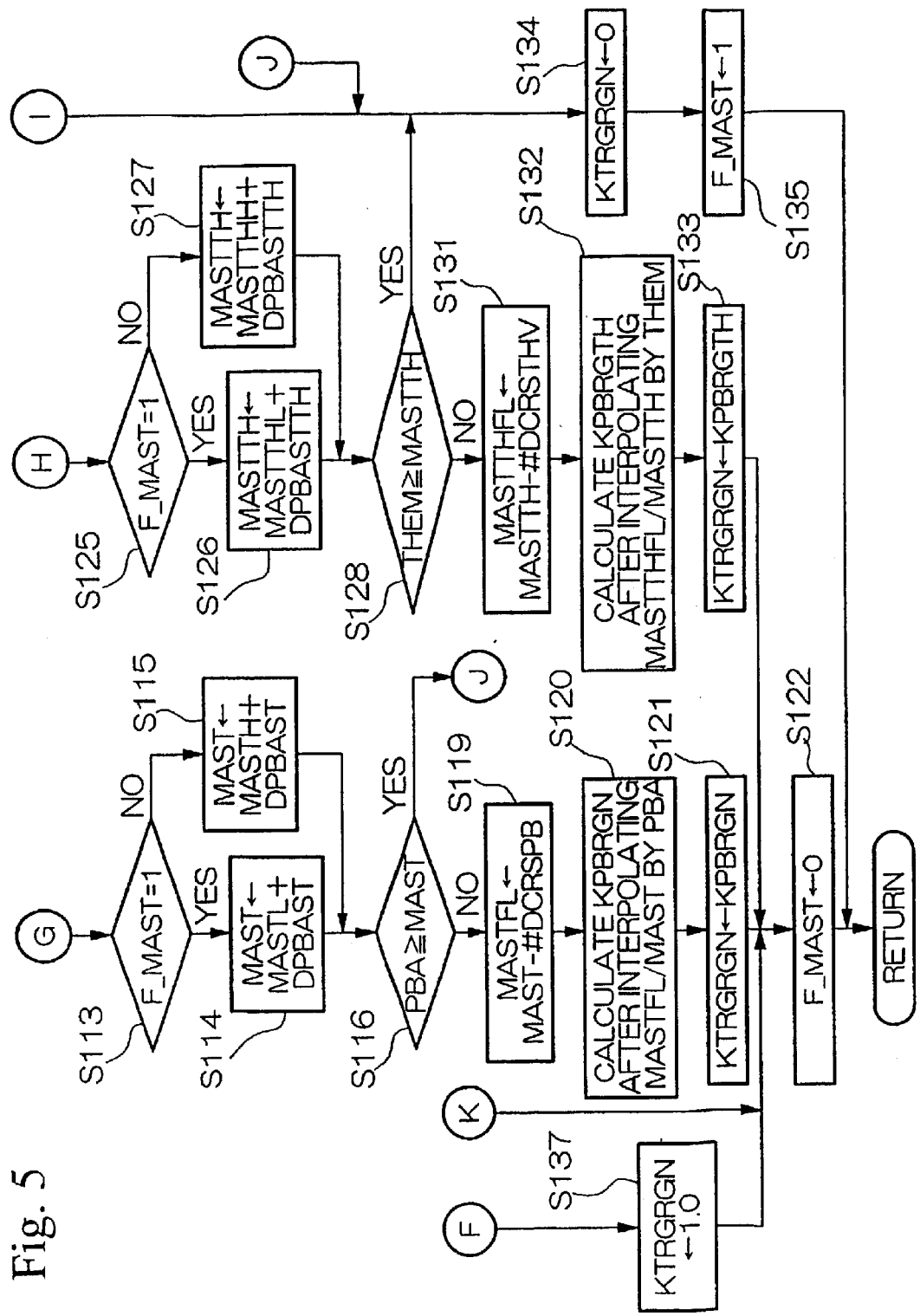
FIG. 5 is a flowchart showing the assist trigger determination of the first embodiment of the present invention.
Figure 6:
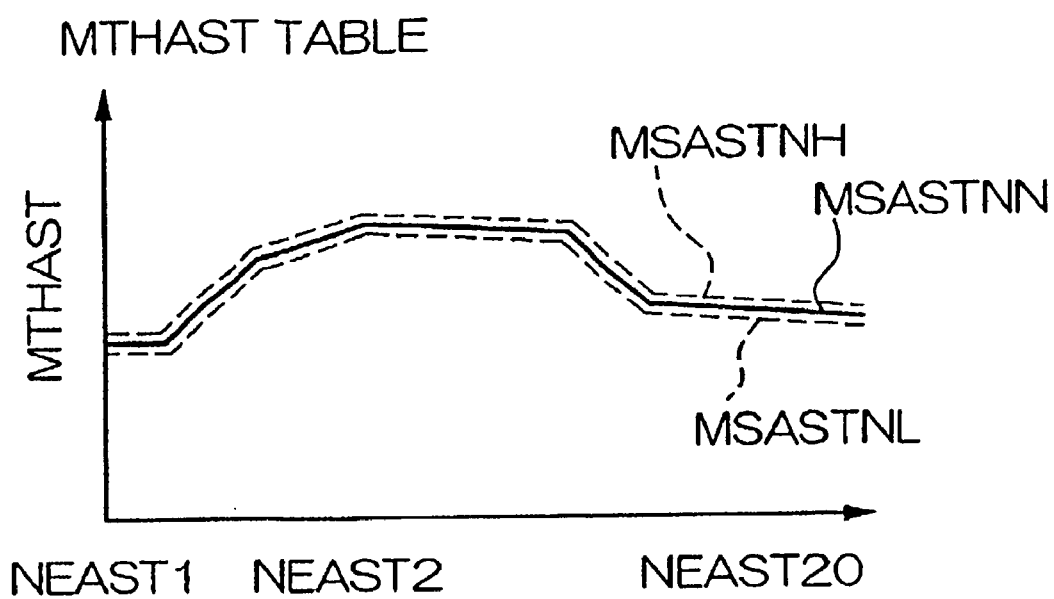
FIG. 6 is a graph showing threshold values for a TH (degree of throttle opening (e.g., the extent of the throttle opening)) assistance mode and for a PB (air intake passage pressure) assistance mode of the present invention.

The assist trigger determination and, more specifically, the determination of the assist/cruise mode based on zones will be explained with reference to FIGS. 4 to 6. FIGS. 4 and 5 are flowcharts showing the assist trigger determination, and FIG. 6 is a graph showing threshold values in TH assistance mode and PB assistance mode.

As shown in FIG. 4, it is determined in step S100 whether the energy storage zone C flag F_ESZONE is 1. When the determination is "YES", that is, when it is determined that the state of charge SOC is in zone C, it is determined in step S136 whether a final assistance command value ASTPWRF is equal to or below 0. When in step S136 the determination is "YES", that is, when the final assistance command value ASTTWRF is equal to or below 0, the cruise generation subtraction coefficient KTRGRGN is set to 1.0 in step S137, the motor assistance determination flag F_MAST is set to 0 in step S122, and the flow returns.

When in steps S100 and S136 the determination is "NO", it is determined whether the vehicle speed VP for the engine control is equal to or below the assist trigger retrieval upper limit vehicle speed #VMASTHG in step S101. The assist trigger retrieval upper limit vehicle speed #VMASTHG is a value having hysteresis.

When in step S101 the determination is "NO", the flow proceeds to step S102. A cruise charge correction coefficient for a high vehicle speed #KVTRGRN which increase depending on the increase of the vehicle speed VP for the engine control is looked up in a table to obtain a cruise generation subtraction coefficient KTRGRGN. The flow then proceeds to step S122 and the series of the above-described steps is completed.

On the other hand, when in step S101 the determination is "YES", a throttle assist trigger correction value DTHAST is calculated in step S103. The contents of this process will be explained later.

In step S104, a threshold value MTHASTN is looked up in a throttle assist trigger table to serve as a standard for the throttle assist trigger. The throttle assist trigger table, as shown in FIG. 6, with the solid lines MTHASTN, defines the threshold value MTHASTN for the degree of throttle opening TH which is the standard for determining whether to perform the motor assistance, and depends on the engine speed NE. The threshold value MTHASTN is defined depending on each of the values of the engine speed NE, for example, 20 values of NEAST1, . . . , NEAST20.

In step S105, the threshold value MTHASTN, the standard of the throttle assist trigger which was looked up in step S104, is added to the correction value DTHAST calculated in step S103 to obtain an upper throttle assist trigger threshold value MTHAST.

In step S106, a TH assist trigger #MTHHAST, which decreases when the engine speed NE is at a relatively low or high speed, is looked up in a table, and a TH assist trigger upper limit value MTHASTH is obtained.

The flow proceeds to step S106A. It is determined whether the upper throttle assist trigger threshold value MTHASTH is equal to or above the TH assist trigger upper limit value MTHHASTN.

When the determination is "NO", the flow proceeds to step S106C. When the determination is "YES", the flow proceeds to step S106B, and then, the upper throttle assist trigger threshold value MTHASTH is set to the TH assist trigger upper limit value MTHHASTN. The flow proceeds to step S106C.

In step S106C, a difference #DMTHAST for setting the hysteresis is extracted from the upper throttle assist trigger threshold value MTHASTH to obtain a lower throttle assist trigger threshold value MTHASTL. When these upper and lower throttle assist trigger threshold values MTHASTH and MTHASTL are plotted with the standard threshold value MTHASTN, which is the standard of the throttle assist trigger table shown in FIG. 6, MTHASTH and MTHASTL are shown by the dashed lines.

In step S107, it is determined whether the present value THEM indicating the degree of throttle opening TH is equal to or above the throttle assist trigger threshold value MTHAST calculated in steps S105 and S106. The throttle assist trigger threshold value MTHAST, which includes the hysteresis mentioned above, refers to the upper throttle assist trigger threshold value MTHASTH when the degree of throttle opening TH is increased, and refers to the lower throttle assist trigger threshold value MTHASTL when the degree of throttle opening TH is decreased When in step S107 the determination is "YES", that is, when the present value THEM of the degree of throttle opening TH is equal to or above the throttle assist trigger threshold value MTHAST (which has upper and lower hysteresis), the flow proceeds to step S109. When in step S107 the determination is "NO", that is, when the present value THEM of the degree of throttle opening TH is not equal to or above the throttle assist trigger threshold value MTHAST (which has upper and lower hysteresis), the flow proceeds to step S108.

In step S109, the throttle motor assistance determination flag F_MASTTH is set to 1. In step S108, the throttle motor assistance determination flag F_MASTTH is set to 0.

In the above process, it is determined whether motor assistance is required according to the degree of throttle opening TH. When in step S107 the present value THEM of the degree of throttle opening TH is equal to or above the throttle assist trigger threshold value MTHAST, the throttle motor assistance deter mination flag F_MASTTH is set to 1. For example, in acceleration mode, the flag is read and it is determined that motor assistance is required.

When in step S108 the throttle motor assistance determination flag F_MASTTH is set to 0, this indicates that the vehicle is outside the zone in which the motor assistance determination is made based on the degree of throttle opening TH. The present invention performs the assist trigger determination based on the degree of throttle opening TH and on the air intake passage pressure PB of the engine. When the present value THEM of the degree of throttle opening TH is equal to or above the throttle assist trigger threshold value MTHAST, the assistance determination is made based on the degree of throttle opening TH, while, when the present value THEM does not exceed the throttle assist trigger threshold value MTHAST, the determination is made based on the air intake passage pressure PB.

In step S109, a throttle motor assistance determination flag F_MASTTH is set to 1, the flow proceeds to step S134. The cruise generation subtractive coefficient KTRGRGN is set to 0 in step S134, the motor assistance determination flag F_MAST is set to 1 in step S135, and the flow returns.

In step S110, it is determined whether an MT/CVT determination flag F_AT is 1. When the determination is "NO", that is, when the vehicle is an MT vehicle, the flow proceeds to step S111. When in step S110 the determination is "YES", that is, when the vehicle is a CVT vehicle, the flow proceeds to step S123. In step S111, an air intake passage pressure (PB) assist trigger correction value DPBAST is calculated. The contents of the process will be described later.

In step S112, the lower and upper PB assist trigger threshold values MASTL and MASTH are calculated. The contents of the process will be described later.

In step S113, it is determined whether the motor assistance determination flag F_MAST is 1. When the flag value is 1, the flow proceeds to step S114. When the flag value is not 1, the flow proceeds to step S115.

In step S114, the lower PB assist trigger threshold value MASTL, which was calculated in step S112, is added to the correction value DPBAST calculated in step S111, to thereby obtain the air intake passage pressure assist trigger value MAST. In step S116, it is determined whether the present value PBA of the air intake passage pressure is equal to or above the air intake passage pressure assist trigger threshold value MAST obtained in step S114. When the determination is "YES", the flow proceeds to step S134. When the determination is "NO", the flow proceeds to step S119.

In step S115, the upper PB assist trigger threshold value MASTH calculated in step S112 is added to the correction value DPBAST calculated in step S111, to thereby obtain the air intake passage pressure assist trigger threshold value MAST, and the flow proceeds to step S116.

In step S119, a predetermined air intake passage pressure (PB) delta value #DCRSPB (e.g., 100 mg) is subtracted from the air intake passage pressure assist trigger threshold value MAST, to thereby obtain a final air intake passage pressure lower threshold value MASTFL. Then, in step S120, the threshold value is interpolated between the final air intake passage pressure lower threshold value MASTFL and the air intake passage pressure assist trigger threshold value MAST, based on the present value PBA of the air intake passage pressure PB, to thereby obtain a cruise generation subtractive coefficient table value KPBRGN. In step S121, this KPBRGN is set to a cruise generation subtractive coefficient KTRGRGN. In step S122, the motor assistance determination flag F_MAST is set to 0, and the flow returns.

When in step S110 the determination of the MT/CVT determination flag F_AT is "YES", that is, when the vehicle is a CVT vehicle, the flow proceeds to step S123. The air intake passage pressure assist trigger correction value DPBASTTH is calculated in step S123. The contents of this process will be explained later.

In step S124, the lower and upper air intake passage pressure assist trigger threshold values MASTTHL and MASTTHH are calculated. The contents of this process will be explained later.

In step S125, it is determined whether the motor assistance determination flag F_MAST is 1. When the flag value is 1, the flow proceeds to step S126. When the flag value is not 1, the flow proceeds to step S127.

In step S126, the lower PB assist trigger threshold value MASTTHL looked up in step S124 is added to the correction value DPBASTTH calculated in step S123, to thereby obtain the PB assist trigger threshold value MASTTH. In step S128, it is determined whether the present value THEM of the degree of throttle opening is equal to or above the PB assist trigger threshold value MASTTH calculated in step S126 or not. When the determination is "YES", the flow proceeds to step S134. When the determination is "NO", the flow proceeds to step S131.

In step S127, the upper PB assist trigger threshold value MASTTH looked up in step S124 is added to the correction value DPBASTTH calculated in step S123, to thereby obtain the PB assist trigger threshold value MASTTH, and the flow proceeds to step S128.

In step S131, a predetermined degree of throttle opening delta value #DCRSTHV is subtracted from the air intake passage pressure assist trigger threshold value MASTTH, to thereby obtain a final air intake passage pressure lower threshold value MASTTHFL. Then, in step S132, the threshold value is interpolated between the final air intake passage pressure lower threshold value MASTTHFL and the air intake passage pressure assist trigger threshold value MASTTH, based on the present value THEM of the degree of throttle opening TH, to thereby obtain a cruise generation subtractive coefficient table value KPBRGTH. In step S133, this KPBRGTH is set to a cruise generation subtractive coefficient KTRGRGN. In step S122, the motor assistance determination flag F_MAST is set to 0, and the flow returns.

TH Assist Trigger Correction

Figure 7:
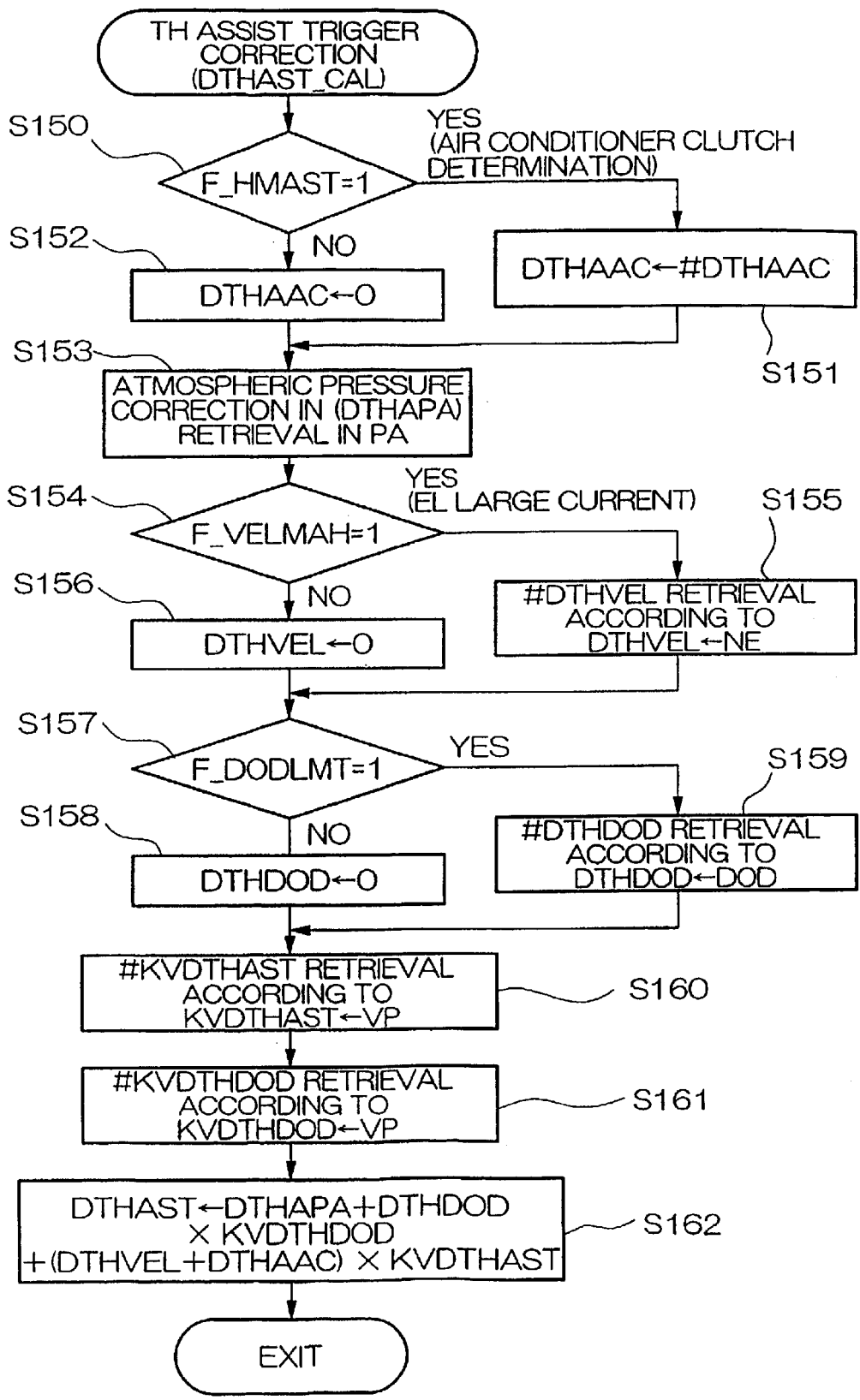
FIG. 7 is a flowchart showing the TH assist trigger correction of the present invention.

The throttle assist trigger correction in step S103 will be explained with reference to FIG. 7. FIG. 7 is a flowchart showing the throttle assist trigger correction process.

As shown in FIG. 7, in step S150, it is determined whether the air-conditioner clutch ON flag F_HMAST is 1. When the determination is "YES", that is, when the air conditioner clutch has been turned on, an air-conditioner correction value DTHAAC is set to a predetermined value #DTHAAC (e.g., 20 degrees) in step S151, and the flow proceeds to step S153.

When in step S150 the determination is "NO", that is, when the air-conditioner clutch has been turned off, the air-conditioner correction value DTHAAC is set to 0 in step S152, and the flow proceeds to step S153. Thus, the threshold value for the motor assistance is increased.

In step S153, an atmospheric pressure correction value DTHAPA is looked up in a throttle assist trigger PA correction table, depending on the atmospheric pressure. The DTHAPA is decreased as the vehicle descends from a high altitude to a low altitude.

In step S154, it is determined whether a large current flag F_VELMAH is 1. The determination of the large current flag will be explained later. When the electric power consumption at 12 volts is increased, the threshold value for the assist trigger is increased. The frequency of acceleration mode is decreased and the frequency of the cruise mode is increased to prevent the remaining battery charge SOC from decreasing. When in step S154 it is determined that a large current is flowing, the large current correction value DTHVEL, which is set so as to decrease when the engine rotational speed NE increases, is looked up in a table in step S155, the flow proceeds to step S157. When in step S154 it is determined that a large current is not flowing, the large current correction value DTHVEL is set to 0. The flow then proceeds to step S157.

In step S157, it is determined whether the depth-of-discharge DOD of the battery is limited, depending on whether the DOD limit determination flag F_DODLMT is set to 1. In step S159, when in the depth-of-discharge limit mode, the depth-of-discharge limit mode correction value #DTHDOD, which is increased as the depth-of-discharge DOD is increased, is looked up in a table, and is set as the DOD limit control mode correction DTHDOD. Then, the flow proceeds to step S160.

Subsequently, when in step S157 the depth-of-discharge limit control mode terminates, the flow proceeds to step S158, and the DOD limit control mode correction value DTHDOD is set to 0.

The predetermined value #DTHDOD is positive in order to increase the value for determining whether to start the motor assist, and reduces the frequency of motor assists in the depth-of-discharge limit control mode. Therefore, in the depth-of-discharge limit mode, the frequency of motor assists is reduced, thereby quickly recovering the remaining battery charge SOC.

In step S160, a throttle assist trigger load correction amount vehicle speed correction coefficient KVDTHAST, which is decreased as the vehicle speed VP for controlling the engine is increased, is looked up in a table. Thus, as the vehicle speed is decreased, the additional amount for the assist trigger threshold value is increased.

Subsequently, in step S161, a throttle assist trigger DOD correction amount vehicle speed correction coefficient KVDTHDOD, which is decreased as the vehicle speed for controlling the engine is increased, is looked up in a table.

In the next step S162, the throttle assist trigger correction value DTHAST is obtained, based on the air-conditioner correction value DTHAAC calculated in step S151 or S152, the atmospheric pressure correction value DTHAPA calculated in step S153, the DOD limit control mode correction value DTHDOD obtained in step S158 or S159, the throttle assist trigger load correction vehicle speed correction coefficient KVDTHAST obtained in step S160, and the throttle assist trigger DOD correction amount vehicle speed correction coefficient KVDTHDOD obtained in step S161, and the control terminates.

In the DOD limit control mode, the assist trigger threshold value is increased by the DOD limit control mode correction value DTHDOD obtained in step S159, and by the throttle assist trigger DOD correction amount vehicle speed correction coefficient KVDTHDOD obtained in step S162.

PB Assist Trigger Correction (for MT)

Figure 8:
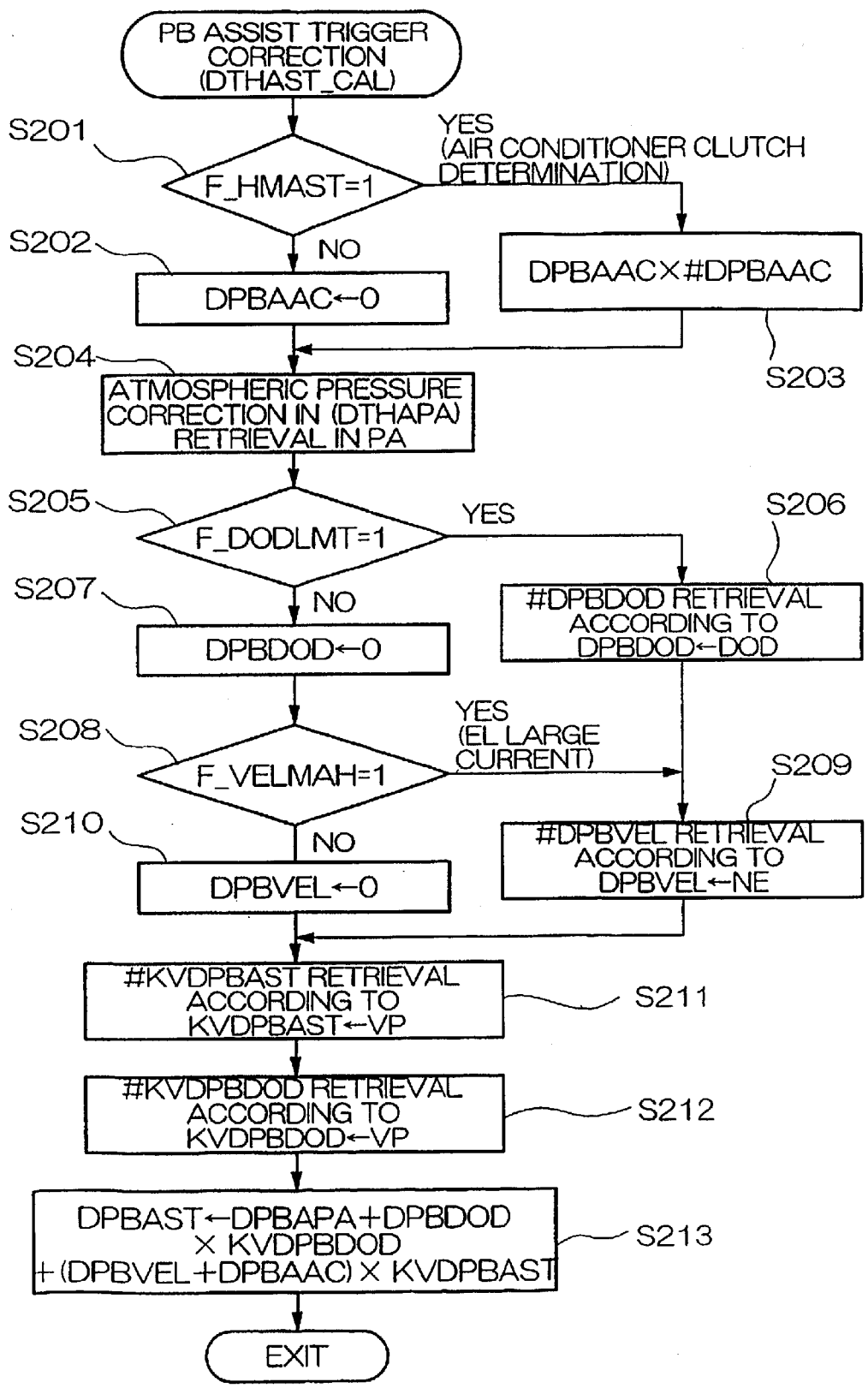
FIG. 8 is a flowchart showing the PB assist trigger correction (for an MT (Manual Transmission) vehicle) of the present invention.
Figure 9:
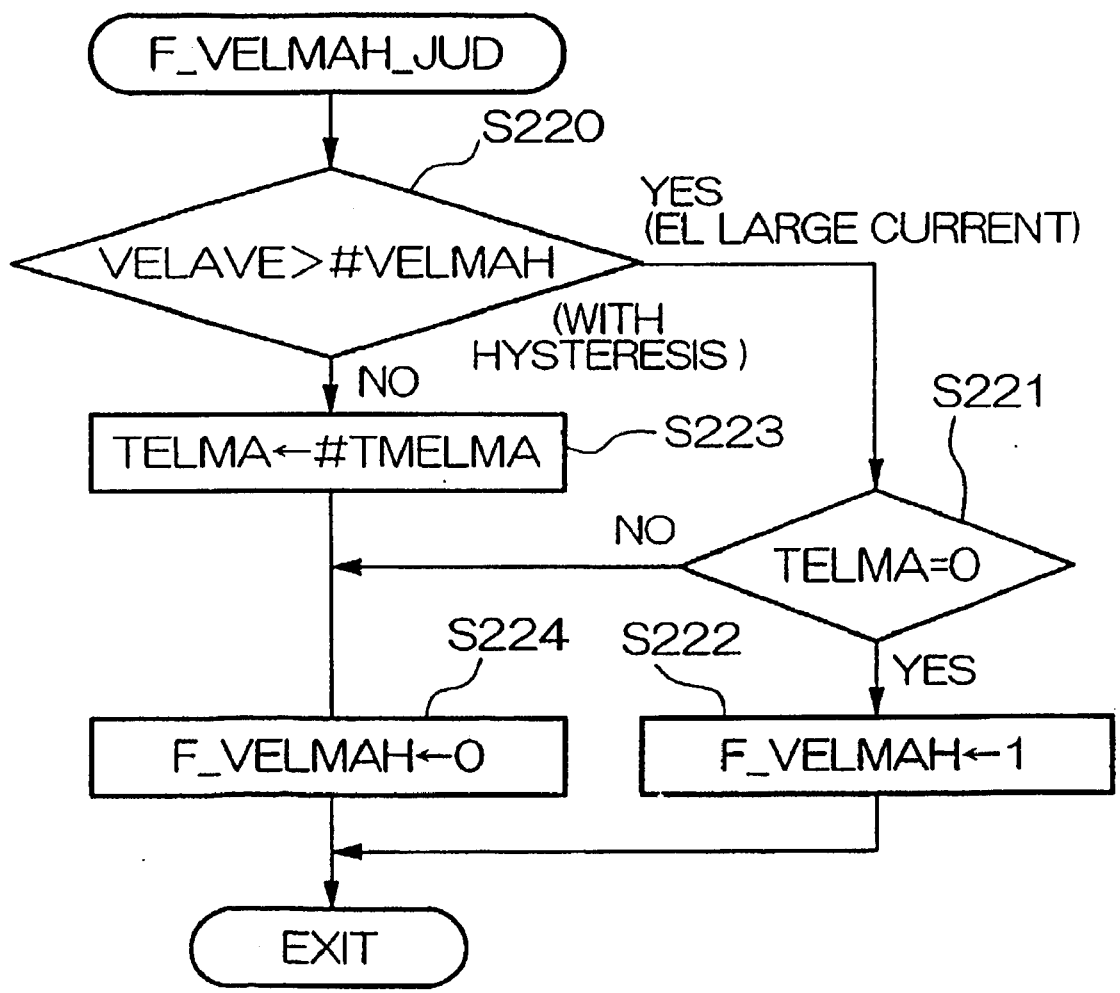
FIG. 9 is a flowchart for determining the large current determination flag of the present invention.

The air intake passage pressure (PB) assist trigger correction in step S111 will be explained with reference to FIGS. 8 and 9. FIG. 8 is a flowchart showing the PB assist trigger correction (for an MT vehicle), and FIG. 9 is a flowchart for setting the high electric current flag.

In step S201 in FIG. 8, it is determined whether an air-conditioner clutch ON flag F_HMAST is 1. When this determination is "YES", that is, when the air-conditioner clutch has been turned on, the air-conditioner correction value DPBAAC is set to a predetermined value #DPBAAC in step S203, and the flow proceeds to step S204.

When in step S201 the determination is "NO", that is, when the air-conditioner clutch has been turned off, the air-conditioner correction value DPBAAC is set to 0 in step S202, and the flow proceeds to step S204. Thus, the threshold value for the motor assistance is increased.

In step S204, an atmospheric pressure correction value DPBAPA, which is decreased as the vehicle travels from a high altitude to a low altitude, is looked up in a table.

In the next step S205, it is determined whether the depth-of-discharge DOD of the battery is limited, depending on whether the DOD limit determination flag F_DODLMT is 1. When in the depth-of-discharge limit control mode, a DOD limit control mode correction value #DPBDOD, which is increased as the depth-of-discharge DOD of the battery is increased, is looked up in a table, and is set as the DOD limit control mode correction value DPBDOD, and the flow proceeds to step S209.

When in step S205 the depth-of-discharge limit control mode is stepped, the flow proceeds to step S207, the DOD limit control mode correction value DPBDOD is set to 0, and the flow proceeds to step S208.

The predetermined value #DTHADOD is positive to increase the value to determine whether the motor assist is started, reducing the frequency of motor assists when in the depth-of-discharge limit control mode. Therefore, in the depth-of-discharge limit control mode, the frequency of motor assists is reduced, thereby quickly increasing the remaining battery charge SOC.

In step S208, it is determined whether the high electric current flag F_VELMAH is 1. The setting of the high electric current flag will be explained below. As described in step S154, when the consumption of the electric current in the 12-volt system is increased, the threshold value for the assist trigger is increased. When in step S208 a large electric current is flowing, a high electric current correction value DPBVEL, which is decreased as the engine speed NE is increased, is looked up in a table in step S209, and the flow proceeds to step S211. When in step S208 a large electric current is not flowing, the high electric current correction value DPBVEL is set to 0 in step S210, and the flow proceeds to step S211.

In the next step S211, the "PB assist trigger load correction vehicle speed correction coefficient" KVDPBAST, which is decreased as the vehicle speed VP for controlling the engine is increased, is looked up in a table.

In the next step S212, the "throttle assist trigger DOD correction vehicle speed correction coefficient" KVDPBDOD, which is decreased as the vehicle speed VP for controlling the engine is increased, is looked up in a table.

In the next step S213, the PB assist trigger correction value DPBAST is calculated, based on the air-conditioner correction value DPBAAC calculated in step S202 or S203, the atmospheric pressure correction value DPBAPA calculated in step S204, the DOD limit control mode correction value DPBDOD obtained in step S206 or S207, the high electric current correction value DPBVEL calculated in step S209 or S210, the PB assist trigger load correction vehicle speed correction coefficient KVDPBAST calculated in step S211, and the throttle assist trigger DOD correction vehicle speed correction coefficient KVDPBDOD calculated in step S212. Then, the control terminates.

Therefore, when in the DOD limit control mode, the assist trigger threshold value is increased by the DOD limit control mode correction value DPBDOD obtained in step S206, and by the throttle assist trigger DOD correction vehicle speed correction coefficient KVDPBDOD.

The flowchart for setting the high electric current flag in FIG. 9 will be explained. In step S220, it is determined whether the average consumed electric current VELAVE is above a predetermined value #VELMAH (e.g., 20A). When the determination is "YES", that is, when a large amount of electric current flows, it is determined in step S221 whether a delay timer TELMA is 0. When it is 0, the high electric current F_VELMAH is set to 1 in step S222, and the control terminates. When in step S221 the delay timer TELMA is not 0, and the flow proceeds to step S224. When in step S220 the determination is "NO", that is, when a large amount of electric current does not flow, the delay timer TELMA is set to a predetermined value #TMELMA (e.g., 30 seconds) in step S223, and the flow proceeds to step S224. In step S224, the high electric current flag F_VELMAH is set to 0, and the control terminates. The high electric current flag F_VELMAH is determined in the above-described steps S154 and S208, and in step S287 which will be described below.

Thus, this process is limited only when the consumed electric current in the 12-volt system has been increased for a specified time measured by the delay timer TELMA, to exclude a temporal increase of the consumed electric current due to, e.g., the up/down movement of power windows, or the lighting of stop lights.

PB Assist Trigger Calculation (for MT)

Figure 10:
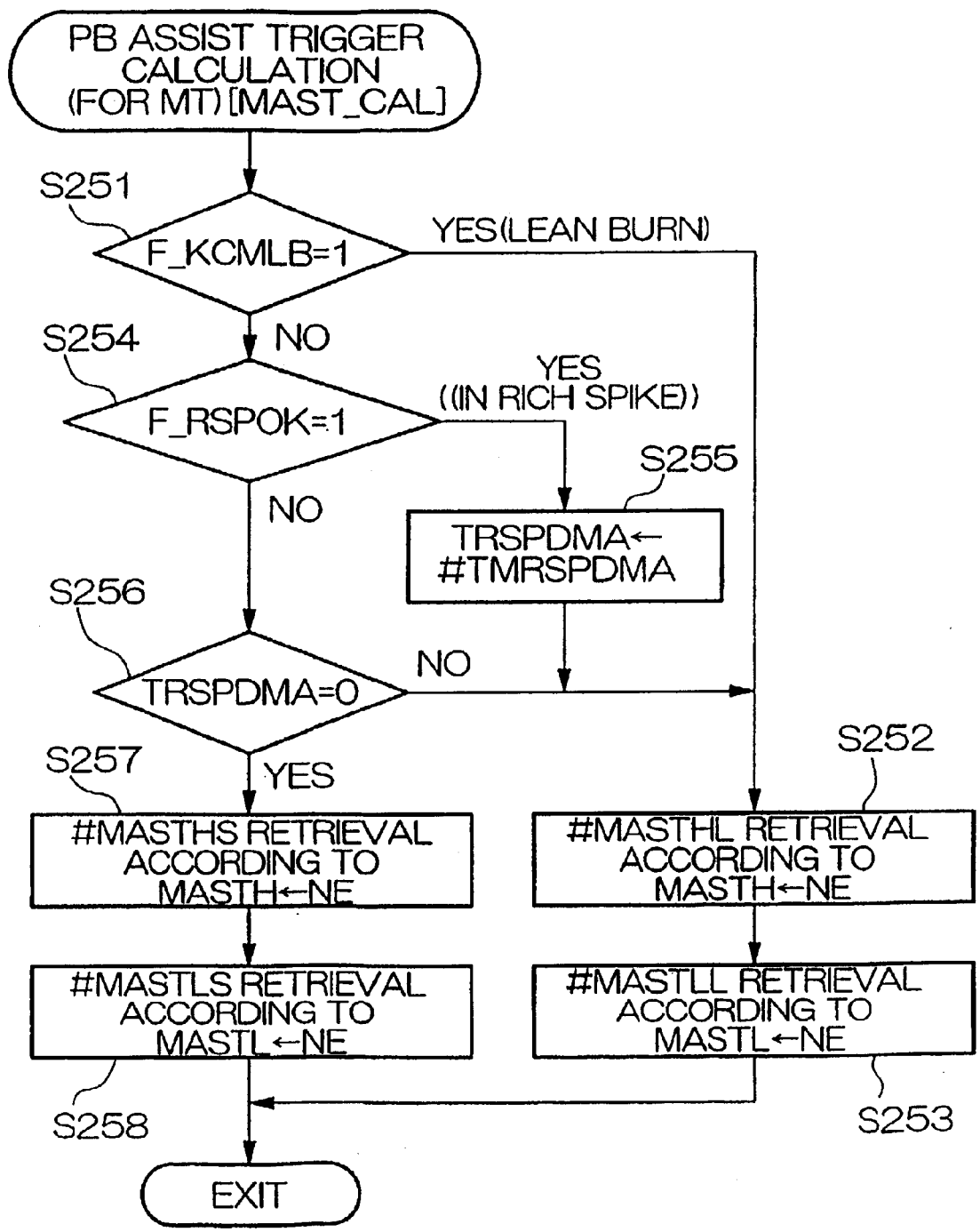
FIG. 10 is a flowchart showing the PB assist trigger calculation (for an MT vehicle) of the present invention.
Figure 11:
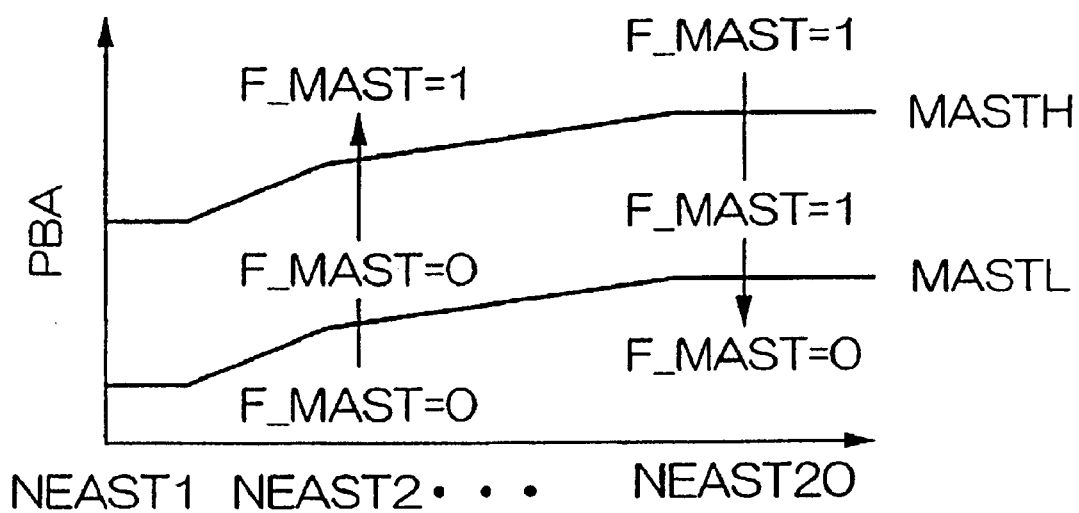
FIG. 11 is a graph showing threshold values in PB assistance mode for an MT vehicle of the present invention.

Next, a processing to calculate a low threshold value MASTL and a high threshold value MASTH of the air intake passage pressure assist trigger (PB assist trigger) is explained with reference to FIGS. 10 and 11. FIG. 11 shows a flow-chart for calculating the assist trigger (MT) and FIG. 11 shows a graph of the threshold values for the MT vehicle in the PB assist mode.

First, in step S251, it is determined whether the lean burn determination flag F_KCMLB is "1". Here, the lean burn flag F_KCMLB is set based on the target air-fuel ratio KCMD, applied for controlling the fuel injection valve (not illustrated) used for fuel supply to the engine E. The target air-fuel ratio is proportional to the reversed value (A/F) of the fuel-air ratio (F/A), and the value for the stoichiometric air-fuel ratio.

If the result of the above determination is "YES", that is, when the air fuel ratio of the air fuel mixture to be supplied to the engine E is set to the leaner side of the stoichiometric air-fuel ratio to be controlled at the leaner side, the flow proceeds to step S252.

In step S252, the high threshold value MASTH of the PB assist trigger is obtained by table retrieving the low side PB assist trigger table value (lean burn) #MASTHL from the air intake passage pressure assist trigger table shown in FIG. 11 in response to the engine rotation speed NE.

Then in subsequent step S253, the low threshold value MASTL of the air intake passage pressure assist trigger is obtained by looking up (table retrieving) the low side PB assist trigger table value (lean burn) #MASTLL in the air intake passage pressure assist trigger table shown in FIG. 11 in response to the engine rotation speed NE.

Here, the air intake passage pressure assist trigger table, as shown by two solid lines in FIG. 11, defines two threshold values, which are the high air intake passage pressure assist trigger threshold value MASTH and the low air intake passage pressure assist trigger threshold value MASTL for determining whether the motor assist is necessary in response to the engine rotation speed NE.

When the high threshold line is crossed from the upper side to the lower side in response to the increase of the air intake passage pressure PBA or the reduction of the engine rotation speed NE, the value of the motor assist determination flag F_MAST is changed from "0" to "1", and when the low threshold value line is crossed from the lower side to the upper side, then the value of the motor assist determination flag F_MAST is changed from "1" to "0".

On the other hand, when it is determined that the result of the determination in step S251 is "NO", indicating that the air-fuel ratio of the air fuel mixture is set richer than the stoichiometric air-fuel ratio, then the flow proceeds to step S254.

In step S254, it is determined whether the rich spike execution determination flag F_RSPOK is "1". It is noted that the value of this flag F_RSPOK is set by FIECU 12, wherein, when a NOx absorbent 42 in the exhaust purification apparatus 40 installed in the exhaust system of the engine E have saturated by absorbing NOx, the rich spike is executed and the determination flag F_RSPOK is set to "1".

When the result of this determination is "YES", that is, when it is determined that a rich spike is being executed, then the flow proceeds to step 255.

In step S255, the rich spike determination timer TRSP-DMA is substituted with the rich spike determination delay time #TMRSPDMA, and the flow proceeds to step S252.

When the result of the determination in step S254 is "NO", indicating that rich spike is not being carried out, the flow proceeds to step S256.

In step S256, it is determined whether the timer value of the rich spike determination timer TRSPDMA is 0. If the result of this determination is "NO", the flow proceeds to step S252.

In contrast, when the result of the determination is "YES", then the flow proceeds to step S257.

In step S257, a high side PB assist trigger table value (stoichiometric) #MASTHS is obtained by table retrieving the air intake passage pressure assist trigger table shown in FIG. 11 in response to the engine rotation speed NE and the high threshold value MASTH of the air intake passage pressure assist trigger is obtained.

Subsequently, the flow proceeds to step S258, wherein the low side PB assist trigger table value (stoichiometric) #MASTLS is looked up (table retrieved) in the air intake passage pressure assist trigger table, and the low threshold value MASTL of the air intake passage pressure assist trigger is obtained.

PB Assist Trigger Correction (for CVT)

Figure 12:
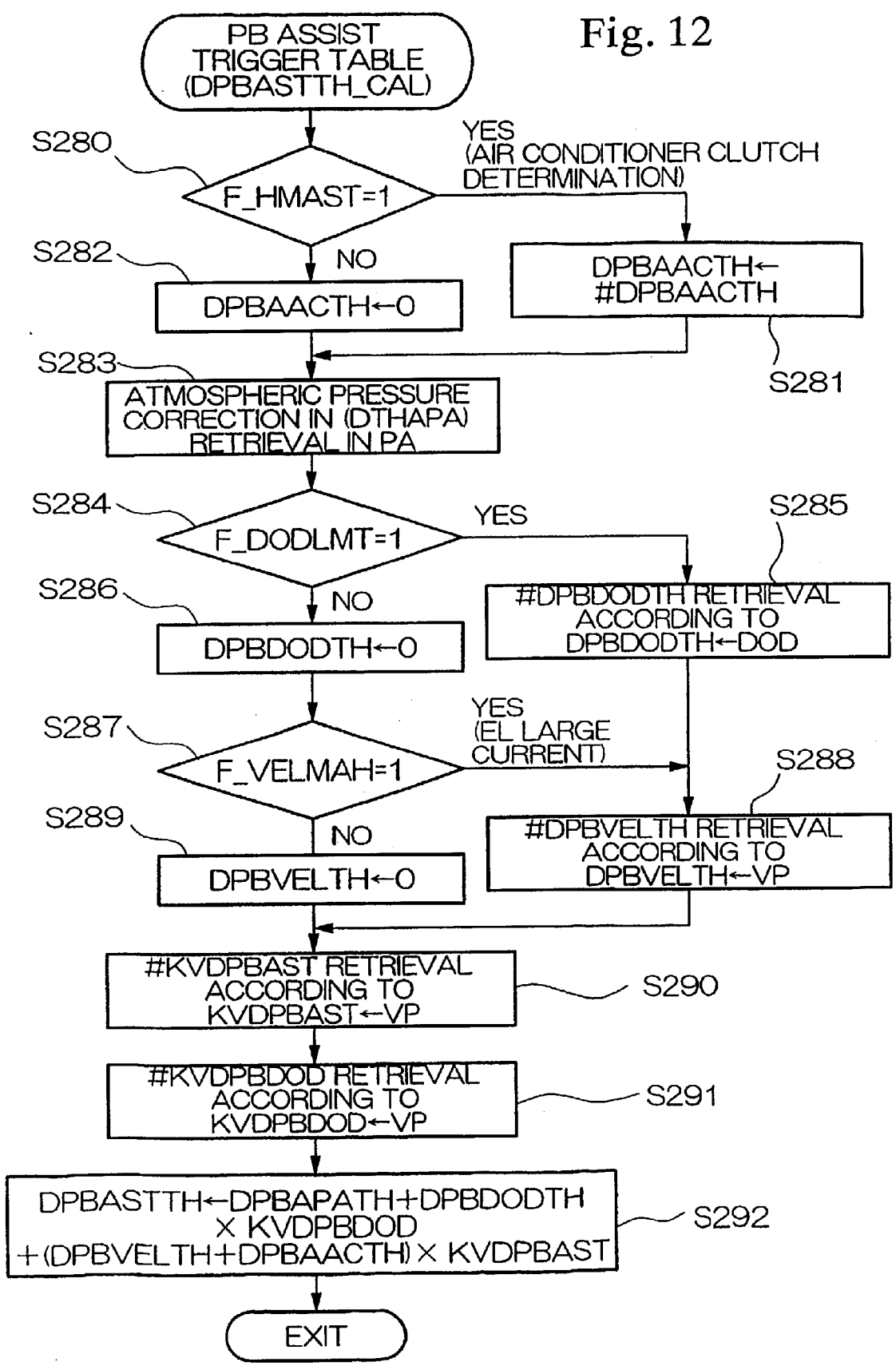
FIG. 12 is a flowchart showing the PB assist trigger correction (for a CVT (Continuously Variable Transmission) vehicle) of the second embodiment of the present invention.

Below, the processing for calculating the air intake passage pressure assist trigger correction executed in the above step S123 is described with reference to the attached drawings. FIG. 12 is a flow-chart for executing the PB assist trigger correction (CVT vehicle).

First, in step S280 shown in FIG. 12, it is determined whether the air-conditioner ON flag F_ACC is "1". When the result is "YES", that is, when the air-conditioner is ON, the flow proceeds to step S282 after assigning a predetermined value #DPBAACTH to the air-conditioning correction value DPBAACTH in step S281.

If the result in step S170 is "NO", that is, the air-conditioner is OFF, the flow goes to step S173 after setting to the air-conditioner correction value DPBAACTH to "0". Thereby, the threshold value for the motor assist is raised.

In step S283, the atmospheric pressure correction value (DPBAPATH) is retrieved in response to the atmospheric pressure. This correction value is retrieved from a table in which correction values are established so as to decrease as the location moves from the heights to the flat. The atmospheric pressure correction value DPBAPATH is thus obtained by the above table retrieval.

Next, in step S284, it is determined whether the limit processing for the battery discharge depth DOD is executed by determining whether the DOD limit determination flag F_DODLMT is "1". When control operation is in the discharge depth limit control mode, the DOD limit control mode correction value #DPBDODTH is table retrieved in step S285, and this value increases with the increase of the battery discharge depth DOD, and is assigned to the DOD limit control mode correction value DPBDODTH, and the flow proceeds to S288.

In contrast, when it is determined in step S284 that the discharge depth limit control mode is released, the flow proceeds to step S286 and the DOD limit control mode correction value DPBDODTH is set to "0".

In this case, a positive value is set as the predetermined value #DPBDODTH in order to raise the determination value for the motor assist operation and in order to make a correction so as to reduce the frequency of the motor assist operation when the control operation is in the discharge depth limit control mode. Thus, since it is possible to reduce the frequency of the motor assist operation when the control operation is in the discharge depth limit control mode, the remaining battery charge can be restored rapidly.

Next, it is determined in step S287 whether the large current flag F_VELMAH is "1", because it is necessary to raise the threshold value of the assist trigger when the current consumed in the 12V system is high, for the same reasons as described above. When the result of the determination in step S287 indicates that a large current is flowing, the large current correction value DPBVELTH, which is reduced as the vehicle speed for controlling the engine increases, is obtained by retrieving (looked up in) a table, and the flow proceeds to step S290. If it is determined in step S287 that the large current is not flowing, "0" is set as the large current correction coefficient DPBVELTH and the flow proceeds to step S290.

Next, in step S290, an air intake negative pressure assist trigger load correction amount vehicle speed correction value KVDPBAST is obtained by table retrieval.

Subsequently, in step S291, throttle assist trigger DOD correction amount vehicle speed correction coefficient KVDPBDOD is obtained by a table retrieval.

In subsequent step S292, the control is completed after obtaining the air conditioner correction value DPBAACTH obtained in step S282, the atmospheric pressure correction value DPBAPATH obtained in step S283, the DOD limit control mode correction value DPBDODTH obtained in step S285 or in step S286, the large current correction value DPBVELTH obtained in step S288 or in step S289, and the air intake passage pressure assist trigger correction value DPBASTTH from the air intake passage pressure assist trigger load correction amount vehicle speed correction coefficient KVDPDOD obtained in step S291.

Accordingly, when the vehicle is in the DOD limit control mode, the assist trigger threshold value is increased by use of the DOD limit control mode correction value DPBDODTH obtained in step S285 or the assist trigger DOD correction value vehicle speed correction coefficient KVDPBDOD obtained in step S291.

PB Assist Trigger Calculation (for CVT)

Figure 13:
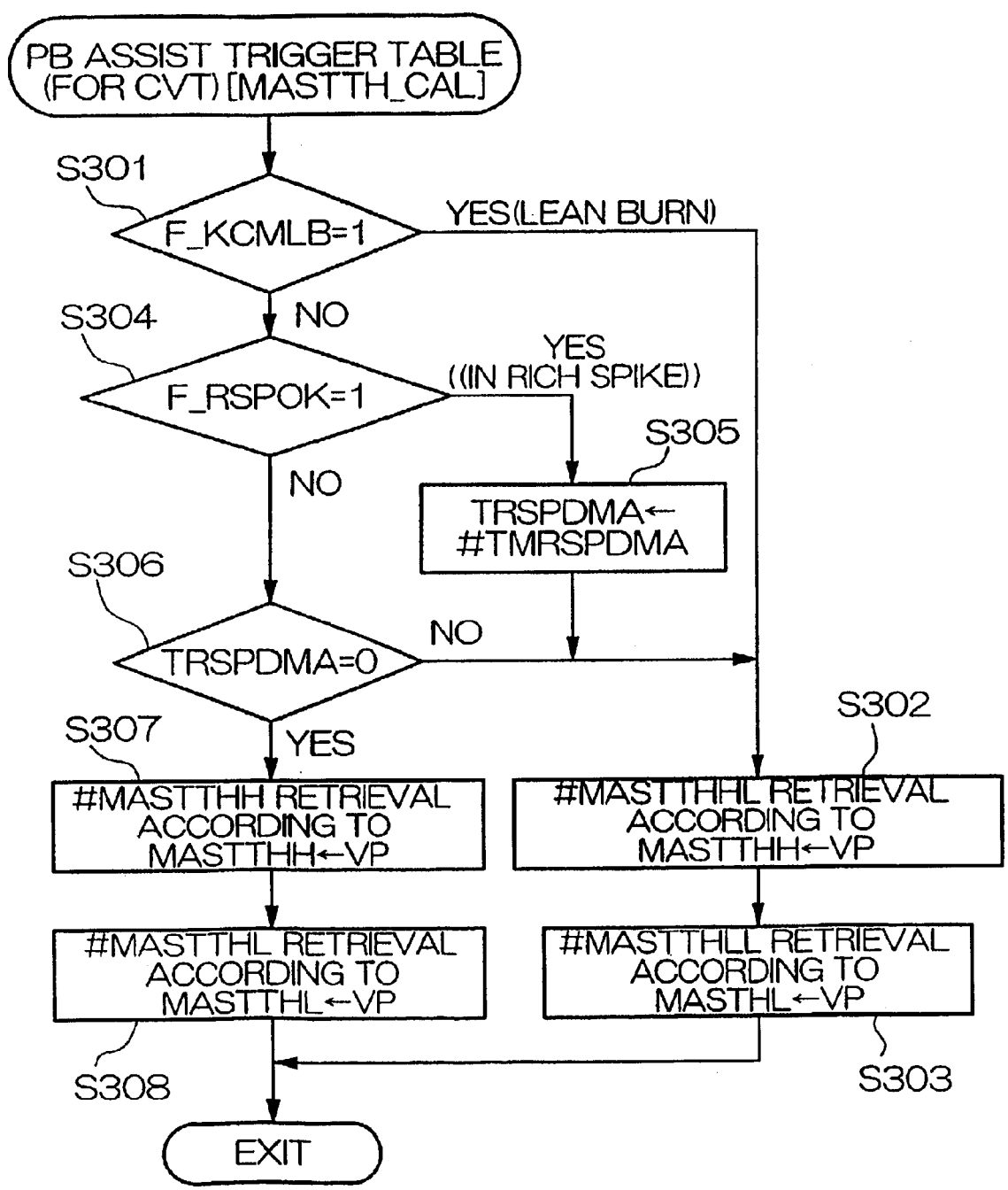
FIG. 13 is a flowchart showing the PB assist trigger calculation (for a CVT vehicle) of the present invention.

Next, the operation in the above step S124 for calculating a lower threshold value MASTTHL and a higher threshold value MASTTHH will be explained with reference to the drawings. FIG. 13 is a flowchart of a PB assist trigger calculating operation applied for a CVT vehicle, and FIG. 14 is a graph showing threshold values of a CVT vehicle in the PB assist mode.

In the first step S301 in FIG. 13, it is determined whether the value of a lean burn determination flag F_KCMLB is 1, where the flag F_KCMLB is set according to, for example, a target air-fuel ratio coefficient (KCMD) used for controlling a fuel injection valve or the like.

If the result of the determination is "YES", that is, if the lean burn control is performed based on the air-fuel ratio (of the air-fuel mixture supplied to the engine E) which is set to the lean side of the stoichiometric air-fuel ratio, then the operation proceeds to step S302.

Figure 14:
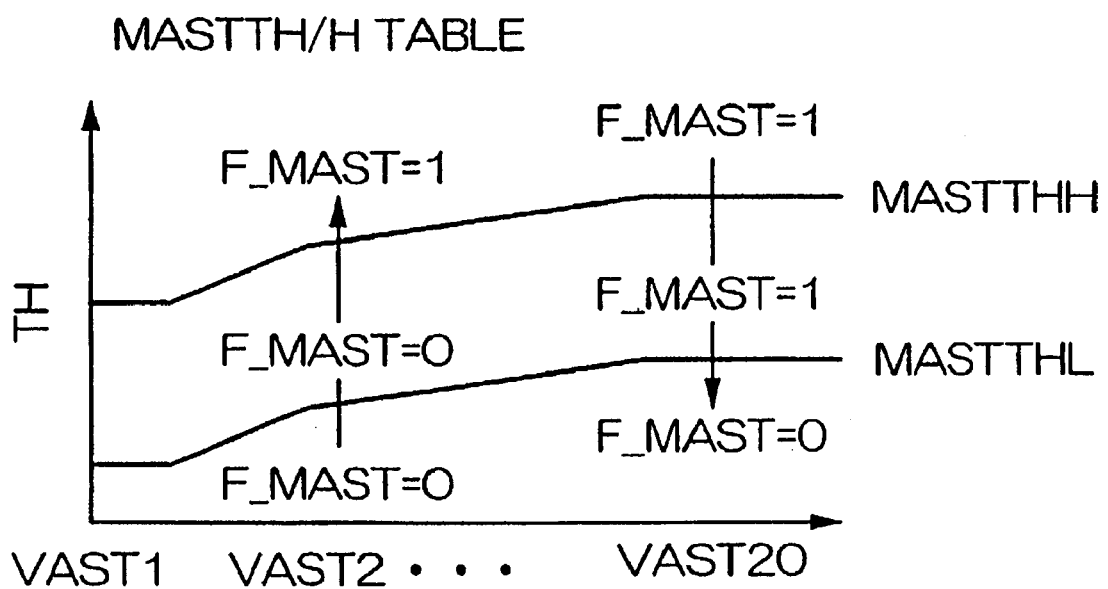
FIG. 14 is a graph showing threshold values in PB assistance mode for a CVT vehicle of the present invention.

In the step S302, an air intake passage pressure assist trigger table as shown in FIG. 14 is searched according to the vehicle speed VP (for engine control), where high PB assist trigger table values (lean burn) #MASTTHHL are searched so as to determine a higher threshold value MASTTHH for the air intake passage pressure assist trigger.

In the next step S303, the air intake passage pressure assist trigger table as shown in FIG. 14 is also searched according to the vehicle speed VP, where low PB assist trigger table values (lean burn) #MASTTHLL are searched so as to determine a lower threshold value MASTRHL for the air intake passage pressure assist trigger.

In the above air intake passage pressure assist trigger table, as shown by two solid lines in FIG. 14, high PB assist trigger threshold values MASTTHH and low PB assist trigger threshold values MASTTHL for determining whether the motor assist operation is performed are defined with respect to each vehicle speed VP for engine control.

If the defined high threshold value line MASTFHH in FIG. 14 is crossed from the lower side to the higher side according to an increase of the degree of throttle opening TH, or a decrease of the vehicle speed VP for engine control, then the value of the motor assist determination flag F_MAST is set from 0 to 1, while if the defined low threshold value line MASTTHL in FIG. 14 is crossed from the higher side to the lower side according to a decrease of the degree of throttle opening TH, or an increase of the vehicle speed VP for engine control, then the value of the motor assist determination flag F_MAST is set from 1 to 0.

In addition, the table to be searched as shown in FIG. 14 is suitably changed for each gear, and according to the state whether the lean burn control is being executed.

If the result of the determination in step S301 is "NO", that is, if the lean burn control is performed based on an air-fuel ratio (of the air-fuel mixture supplied to the engine E) which is set equal to or to the rich side of the stoichiometric air-fuel ratio (i.e., in the rich spike), then the operation proceeds to step S304.

In the step S304, it is determined whether the value of flag F_PSPOK is 1. The flag F_PSPOK is provided for determining whether the rich spike control is being executed.

In the next step S305, the value of a rich spike determination timer TRSPDMA is set to a predetermined rich spike determination delay time #TMRSPDMA, and the operation proceeds to step S302.

If the result of the determination in step S304 is "NO", that is, if the rich spike control is not being executed, then the operation proceeds to step S306.

In the step S306, it is determined whether the timer value of the rich spike determination timer TRSPDMA is 0. If the result of the determination is "NO", then the operation proceeds to step S302, while if the result of the determination is "YES", the operation proceeds to step S307.

In the step S307, an air intake passage pressure assist trigger table as shown in FIG. 14 is searched according to the vehicle speed VP (for engine control), where high PB assist trigger table values (lean burn) #MASTTHH are searched so as to determine a higher threshold value MASTTHH for the air intake passage pressure assist trigger.

In the next step S308, the air intake passage pressure assist trigger table as shown in FIG. 14 is also searched according to the vehicle speed VP, where low PB assist trigger table values (lean burn) #MASTTHL are searched so as to determine a lower threshold value MASTTHL for the air intake passage pressure assist trigger.

According to the control system 1 of hybrid vehicles in the present embodiment, even if it is determined that the value of the lean burn determination flag F_KCMLB is not 1 in step S251 or S301, that is, even if it is determined that the lean burn control is not being executed, it is determined whether the rich spike control is being executed in step S254 or S304. In addition, the air intake passage pressure assist trigger threshold value MAST/MASTTH is determined as a value suitable for the lean burn control, for the predetermined rich spike determination delay time #TMRSPDMA from the starting time of the rich spike. Therefore, the change of the air intake passage pressure assist trigger threshold value MAST/MASTMH for each execution or start of the rich spike control is prohibited.

Accordingly, the assistance using motor M for assisting the output of engine E is not abruptly performed every time the rich spike is executed. Therefore, even if the rich spike control is repeatedly performed, an abrupt change of the driving condition of the vehicle is prevented, so that a smooth driving state can be maintained.

In the above-explained embodiment, if the rich spike control in which the air-fuel ratio (of the air-fuel mixture supplied to the engine E) is set to the rich side of the stoichiometric air-fuel ratio is performed so as to provide a relatively low oxygen concentration in the exhaust gas, then the rich spike may be performed at regular intervals according to the vehicle speed V, based on a signal from the vehicle speed sensor S1, or at regular intervals according to the engine speed NE, based on a signal from the engine speed sensor S2.

What is claimed is:

1. A control system for a hybrid vehicle with a combustion engine for outputting a driving force, an electric motor for generating power for assisting the output power from the engine, depending on driving conditions, a power storage unit for storing electric energy generated by the motor acting as a generator using the output power from the engine and electric energy regenerated by the motor when the vehicle decelerates, the control system comprising:

an output assist determination means for determining, based on a determination threshold value as the standard, whether the power generated by the electric motor is to be used to assist the output power from the engine depending on the driving conditions of the vehicle;

an air-fuel controller for changing the air-fuel ratio of the mixture, which is to be supplied to the engine, to a condition leaner or richer than the stoichiometric air-fuel ratio; and a determination threshold value changing means for changing the determination threshold value, depending on whether the air-fuel ratio of the mixture is leaner or richer than the stoichiometric air-fuel ratio.

2. The control system for a hybrid vehicle according to claim 1, further comprising a terminating means for terminating the prohibition of the change of the determination threshold value while the determination threshold value change prohibiting means prohibits the change of the determination threshold value, when the air-fuel ratio controller detects that the air-fuel ratio of the mixture is leaner than the stoichiometric air-fuel ratio, or when the prohibition of the change of the determination threshold value has been maintained for a specified time.

3. A control system for a hybrid vehicle with a combustion engine for outputting a driving force, an electric motor for generating a power for assisting the output power from the engine, depending on driving conditions, a power storage unit for storing electric energy generated by the motor acting as a generator using the output power from the engine and electric energy regenerated by the motor when the vehicle decelerates, the control system comprising:

an output assist determination means for determining, based on a determination threshold value as the standard, whether the power generated by the electric motor is to be used to assist the output power from the engine, depending on the driving condition of the vehicle;

an air-fuel controller for changing the air-fuel ratio of the mixture, which is to be supplied to the engine, to a condition leaner or richer than the stoichiometric air-fuel ratio;

a determination threshold value changing means for changing the determination threshold value, depending on whether the air-fuel ratio of the mixture is leaner or richer than the stoichiometric air-fuel ratio;

an exhaust cleaner having an oxygen concentration measurement device, provided in an exhaust system of the engine, for measuring oxygen concentration in exhaust gas, and a nitrogen oxide reduction device for absorbing nitrogen oxide in the exhaust gas when the oxygen concentration in the exhaust gas is high and for reducing the absorbed nitrogen oxide when the oxygen concentration in the exhaust gas is low;

a reduction device means for setting the air-fuel ratio of the mixture to the condition richer than the stoichiometric air-fuel ratio of the mixture to the condition richer than the stoichiometric air-fuel ratio so as to reduce the oxygen concentration in the exhaust gas, when the air-fuel ratio of the mixture, which is to be supplied to the engine, is leaner than the stoichiometric air-fuel ratio; and a determination threshold value change prohibiting means for prohibiting the operation of the determination threshold value changing means when the reduction means changes the air-fuel ratio of the mixture from the condition leaner than the stoichiometric air-fuel ratio to the condition richer than the stoichiometric air-fuel ratio.

4. A control system for a hybrid vehicle according to claim 3, further comprising:

a vehicle speed measuring device for detecting the speed of the vehicle, wherein
the reduction device sets the air-fuel ratio of the mixture to the condition richer than the stoichiometric air-fuel ratio so as to reduce the oxygen concentration in the exhaust gas at a time interval depending on the vehicle speed detected by the vehicle speed measuring device.

5. A control system for a hybrid vehicle according to claim 3, further comprising a terminating means for terminating the prohibition of the change of the determination threshold value while the determination threshold value change prohibiting means is prohibiting the change of the determination threshold value, when the air-fuel ratio controller detects that the air-fuel ratio of the mixture is leaner than the stoichiometric air-fuel ratio, or when the probation of the change of the determination threshold value is maintained for a specified time.

6. A control system for a hybrid vehicle according to claim 4, further comprising a terminating means for terminating the prohibition of the change of the determination threshold value while the determination threshold value change prohibiting means prohibits the change of the determination threshold value, when the air-fuel ratio controller detects that the air-fuel ratio of the mixture is leaner than the stoichiometric air-fuel ratio, or when the prohibition of the change of the determination threshold value has been maintained for a specified time.

7. A control method for a hybrid vehicle having a combustion engine for outputting a driving force; an electric motor for generating a force for assisting the output from the engine, depending on driving conditions; and a power storage unit for storing electric energy generated by the motor acting as a generator using the output from the engine and electric energy regenerated by the motor when the vehicle decelerates;

the control method comprising the steps of:
determining whether to assist the output from the engine by the motor based on a determination threshold value as the standard, depending on the driving conditions of the vehicle;
changing the air-fuel ratio of the mixture, which is to be supplied to the engine, to a condition leaner or richer than the stoichiometric air-fuel ratio; and
changing the determination threshold value depending on whether the air-fuel ratio of the mixture is leaner or richer than the stoichiometric air-fuel ratio.

8. A control method according to claim 7, further comprising the step of terminating the prohibition of the change of the determination threshold value while the change of the determination threshold value is prohibited, when the air-fuel ratio of the mixture is determined to be leaner than the stoichiometric air-fuel ratio, or when the prohibition of the change of the determination threshold value has been maintained for a specified time.

9. A control method for a hybrid vehicle having a combustion engine for outputting a driving force; and electric motor for generating a force for assisting the output from the engine, depending on driving conditions; and a power storage unit for storing electric energy generated by the motor acting as a generator using the output from the engine and electric energy regenerate by the motor when the vehicle decelerates;

the control system comprising the steps of:
determining whether to assist the output from the engine by the motor based on a determination threshold value as the standard, depending on the driving condition of the vehicle;
changing the air-fuel ratio of the mixture, which is to be supplied to the engine, to a condition leaner or richer than the stoichiometric air-fuel ratio; and
changing the determination threshold value depending on whether the air-fuel ratio of the mixture is leaner or richer than the stoichiometric air-fuel ratio;
measuring oxygen concentration in exhaust gas;
absorbing nitrogen oxide in the exhaust gas when the oxygen concentration in the exhaust gas is high;
reducing the absorbed nitrogen oxide when the oxygen concentration in the exhaust gas is low;
setting the air-fuel ratio of the mixture to a condition richer than the stoichiometric air-fuel ratio so as to reduce the oxygen concentration in the exhaust gas, when the air-fuel ratio of the mixture, which is to be supplied to the engine, is leaner than the stoichiometric air-fuel ratio; and
prohibiting the change of the determination threshold value when the air-fuel ratio of the mixture is changed from the condition leaner than the stoichiometric air-fuel ratio to the condition richer than the stoichiometric air-fuel ratio.

10. A control method according to claim 9, further comprising the steps of detecting the speed of the vehicle, and setting the air-fuel ratio so as to reduce the oxygen concentration in the exhaust gas at a time interval depending on the vehicle speed detected.

11. A control method according to claim 9, further comprising the step of terminating the prohibition of the change of the determination threshold value while the change of the determination threshold value is prohibited, when the air-fuel ratio of the mixture is determined to be leaner than the stoichiometric air-fuel ratio, or when the prohibition of the change of the determination threshold value has been maintained for a specified time.

12. The control system as recited in claim 1, wherein the determination threshold value is one of a throttle assist trigger threshold value and an air intake passage pressure assist trigger threshold value.

13. The control system as recited in claim 3, wherein the determination threshold value is one of a throttle assist trigger threshold value and an air intake passage pressure assist trigger threshold value.

* * * * *